United States Patent
Hikima

[19]
[11] Patent Number: 6,091,682
[45] Date of Patent: Jul. 18, 2000

[54] APPARATUS FOR AND METHOD OF DETECTING PRE-PIT INFORMATION

[75] Inventor: Hiroshi Hikima, Tokorozawa, Japan

[73] Assignee: Pioneer Electronic Corporation, Tokyo-To, Japan

[21] Appl. No.: 09/090,706

[22] Filed: Jun. 4, 1998

[30] Foreign Application Priority Data

Jun. 6, 1997 [JP] Japan .................................. 9-149770

[51] Int. Cl.⁷ ........................................................ G11B 7/00
[52] U.S. Cl. ................................................ 369/47; 369/50
[58] Field of Search .................................. 369/47, 59, 54, 369/48, 44.13, 50

[56] References Cited

U.S. PATENT DOCUMENTS 5,936,933   7/1999   Miyamoto et al. .................. 369/44.13

*Primary Examiner*—Nabil Hindi
*Attorney, Agent, or Firm*—Ladas & Parry

[57] ABSTRACT

An information detecting device detects information recorded in a form of pre-pits on a storage medium which is recorded with movement control information recorded by wobbling information tracks at a frequency corresponding to the movement control information and the recording control information recorded by forming the pre-pits on neighboring tracks of the information track. The device includes: a pickup for irradiating a light beam on the information track and the neighboring tracks at the same time and for outputting a reproduction signal based on the light beam reflected by the information track and the neighboring tracks; a wobbling signal extracting unit for extracting only the wobbling signal indicating the movement control information from the reproduction signal outputted; a pre-pit signal detector for detecting a pre-pit signal mixed with the wobbling signal from the reproduction signal outputted; a measuring unit for measuring a pre-pit signal absent period, in which the pre-pit signal detector detects no pre-pit signal, on a wobbling signal period basis; and a detection enabling unit for judging whether or not the pre-pit signal absent period accords with a first predetermined period, and for enabling the pre-pit signal detection by the pre-pit signal detector in a second predetermined period determined on the basis of the wobbling signal period if the pre-pit signal absent period accords with the first predetermined period.

10 Claims, 17 Drawing Sheets

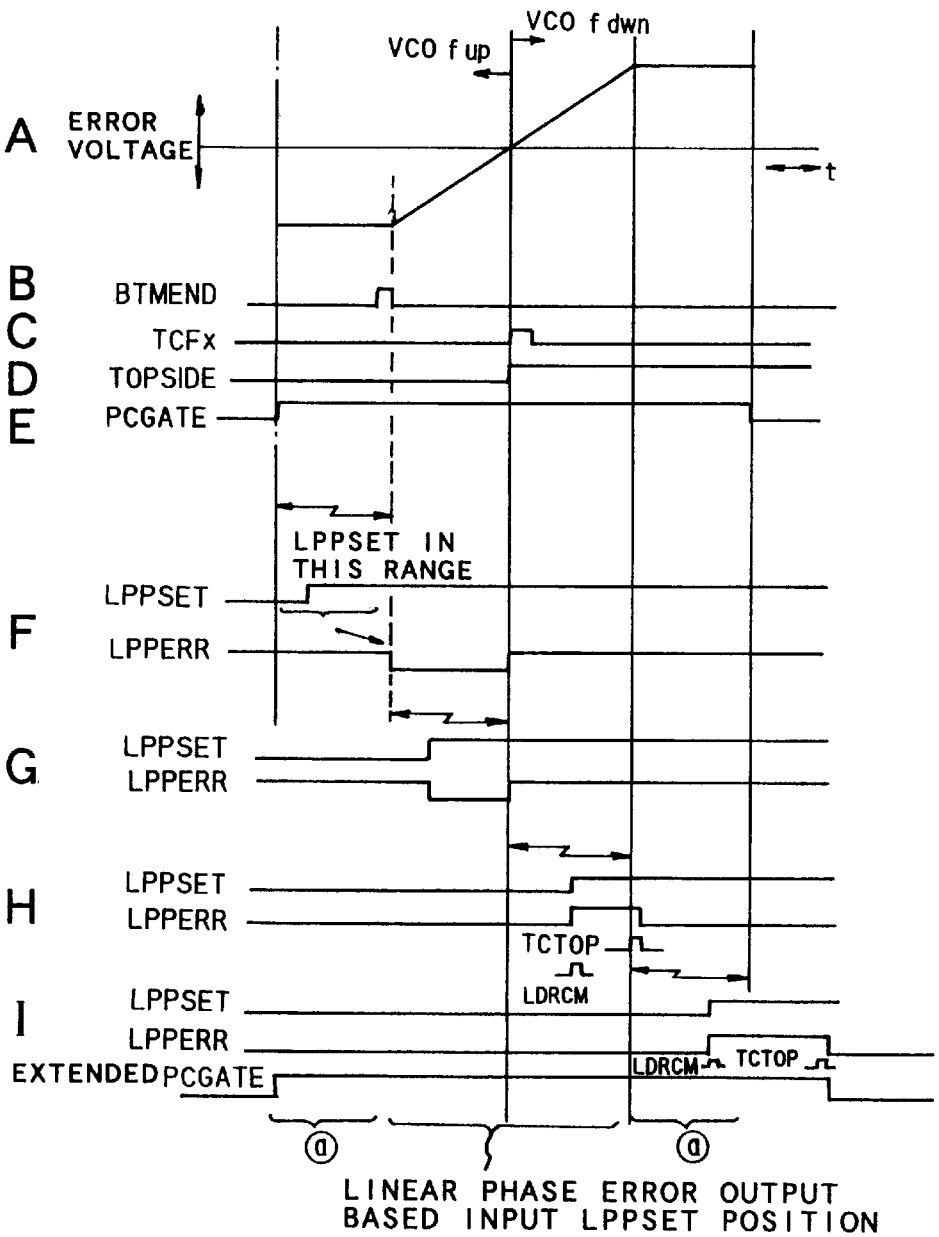

APPARATUS FOR AND METHOD OF DETECTING PRE-PIT INFORMATION

BACKGROUND OF THE INVENTION

1. Field of the Invention

The present invention generally relates to a Write-Once type storage medium, such as a DVD-R (DVD-Recordable), which has much higher recording density than a known CD (Compact Disc). More specifically, the present invention relates to an apparatus for and a method of detecting, from a DVD-R, prerecorded information including address information needed to detect the recording position at the time of recording video information and rotation control information, such as synchronization information and wobbling information, used for the rotation control of the DVD-R (these prerecorded information will be hereinafter referred to as "pre-information").

2. Description of the Prior Art

Recently, there is known a CD-R (Compact Disc-Recordable) which has approximately the same recording capacity as a CD and is recorded with pre-information to enable additional recording thereon using the pre-information recorded. A CD-R is recorded with pre-information, at the pre-formatting stage of its manufacturing, in such manner that information tracks (i.e., groove tracks and land tracks) for carrying information is wobbled in a wave-like manner at the frequency obtained by frequency-modulating the pre-information to be recorded. When recording information such as video and/or audio information (these information will be hereinafter referred to as "main information", to distinguish them from the above-mentioned pre-information) onto a CD-R, the wobbling frequency of the wobbled tracks is detected to obtain the reference clock for the rotational control of the CD-R. Then, the drive signal for the rotation control of the spindle motor is produced on the basis of the reference clock thus obtained, and the recording clock including the timing information synchronized with the rotation of CD-R is also produced. Further, at the time of recording main information, the pre-information is reproduced to obtain the address information indicative of the address (i.e., position) on the CD-R and then the desired recording position of main information is detected using the address information thus obtained, thereby enabling recording main information.

However, since a DVD-R has a track pitch between neighboring tracks of approximately half of that of a CD-R for the reason of achieving high recording density, the wobbling signals of neighboring tracks interfere with each other and the wobbling frequency may not be correctly detected if the information tracks are wobbled like the manner of a CD-R. In this view, the information tracks of DVD-R (e.g., groove tracks) are wobbled at the frequency based on the reference clock to record pre-information, and pre-information is additionally recorded in the form of pre-pits formed on the tracks (e.g., land tracks) neighboring the information tracks. The pre-pits are formed uniformly over the all surface of the DVD-R so that the reference clock can also be obtained from the pre-pits if necessary. Conventionally, the pre-information is obtained by detecting the pre-pits, and the rotation control and the recording control is performed based on the pre-information thus obtained.

The pre-pits are detected in the following manner. First, a signal including the wobbling frequency component (hereinafter referred to as "wobbling signal") is obtained by irradiating a light beam onto the information tracks and then a gate signal synchronized with the wobbling signal is produced. Then, the wobbling signal is compared with a predetermined threshold signal to extract the signal component exceeding the threshold. Then, the logical product of the signal component thus extracted and the gate signal is taken to extract the pre-pit signal from the wobbling signal, thereby detecting the pre-pits.

Therefore, noise may be mixed into the wobbling signal and may be erroneously detected as the pre-pit if dust or the like is present on the disc or there is crosstalk intermixture from the neighboring tracks. Consequently, the address information or the synchronization information, necessary for the position detection at the time of main information recording, can not be correctly obtained, resulting in malfunction of the recording apparatus for DVD-R.

SUMMARY OF THE INVENTION

It is an object of the present invention to provide an apparatus for and a method of detecting pre-pit information, which enable correct detection of the pre-pit information if noise component is mixed in the wobbling signal.

According to one aspect of the present invention, there is provided an information detecting device for detecting information recorded in a form of pre-pits on a storage medium which is recorded with movement control information for controlling a moving speed of the storage medium at the time of recording main information on the storage medium and recording control information for use in a recording control at the time of recording the main information, the movement control information being recorded by wobbling information tracks for carrying the main information at a frequency corresponding to the movement control information, the recording control information being recorded by forming the pre-pits on neighboring tracks of the information track in a predetermined relation in phase with the wobbled information tracks, the device including: a pickup for irradiating a light beam on the information track and the neighboring tracks at the same time and for outputting a reproduction signal based on the light beam reflected by the information track and the neighboring tracks; a wobbling signal extracting unit for extracting only the wobbling signal indicating the movement control information from the reproduction signal outputted; a pre-pit signal detector for detecting a pre-pit signal mixed with the wobbling signal from the reproduction signal outputted; a measuring unit for measuring a pre-pit signal absent period, in which the pre-pit signal detector detects no pre-pit signal, on a wobbling signal period basis; and a detection enabling unit for judging whether or not the pre-pit signal absent period accords with a first predetermined period, and for enabling the pre-pit signal detection by the pre-pit signal detector in a second predetermined period determined on the basis of the wobbling signal period if the pre-pit signal absent period accords with the first predetermined period.

In accordance with the device described above, the light beam is irradiated on the storage medium, and the wobbling signal is detected. The wobbling signal is mixed with the pre-pit signal in only a predetermined period, and hence the period with pre-pit information mixed and the period with no pre-pit information mixed alternately appear. Then, pre-pit signal absent period is detected on the wobbling signal period basis. If the pre-pit signal absent period accords with the first predetermined period, the pre-pit signal present period comes next, and hence the pre-pit signal detection is enabled. As a result, it is ensured that the pre-pit detection is executed in the pre-pit signal present period, thereby avoiding erroneous detection of the noise component as a pre-pit signal.

The device may further include a first counter for counting the second predetermined period; and a second counter for starting a free-running at a period corresponding to the wobbling signal period in response to a first pre-pit detection after the pre-pit detection is enabled and for counting a time passage from a start of the free-running.

With this arrangement, the free-running starts at a period corresponding to the wobbling signal period in response to a first pre-pit detection after the pre-pit detection is enabled, and the time passage from a start of the free-running is counted. Therefore, after the start of the free-running, the pre-pit signal present period and the pre-pit signal absent period are discriminated, and information can be correctly obtained from the pre-pit signal without the disturbance from the noise component.

The device may further include a comparator for comparing a counting start timing by the first counter with a counting start timing by the second counter and for calculating a discordance number of the counting start timings on the wobbling signal period basis; and a correcting unit for restarting one of the first counter and the second counter based on the discordance number. By this, if counting by the first or second counter is started at improper timing, the erroneous timing may be corrected.

The device may further include a timing signal generator for generating a timing signal for use in a pre-pit signal analysis in accordance with the time passage counted by the second counter. Therefore, the timing signal free from the noise can be detected, and the accurate pre-pit detection can be carried out.

The device may further include a reference signal generator for generating a reference signal of a given frequency; and a phase comparator for comparing the phase of the pre-pit signal with the phase of the reference signal to vary the frequency of the reference signal such that a phase difference between the pre-pit signal and the reference signal converges to be within a given range, the phase comparator being enabled only within a period when the timing signal generator outputs the timing signal. With this arrangement, the phase of the pre-pit signal always accords with the reference signal. In addition, since the phase comparison is enabled only during the period in which the timing signal is outputted, it can operate correctly without being disturbed by the noise component.

According to another aspect of the present invention, there is provided a method of detecting information recorded in a form of pre-pits on a storage medium which is recorded with movement control information for controlling a moving speed of the storage medium at the time of recording main information on the storage medium and recording control information for use in a recording control at the time of recording the main information, the movement control information being recorded by wobbling information tracks for carrying the main information at a frequency corresponding to the movement control information, the recording control information being recorded by forming the pre-pits on neighboring tracks of the information track in a predetermined relation in phase with the wobbled information tracks, the method including the steps of: irradiating a light beam on the information track and the neighboring tracks at the same time and outputting a reproduction signal based on the light beam reflected by the information track and the neighboring tracks; extracting only the wobbling signal indicating the movement control information from the reproduction signal outputted; detecting a pre-pit signal mixed with the wobbling signal from the reproduction signal outputted; measuring a pre-pit signal absent period, in which no pre-pit signal is detected, on a wobbling signal period basis; and judging whether or not the pre-pit signal absent period accords with a first predetermined period, and enabling the pre-pit signal detection in the pre-pit signal detection step within a second predetermined period determined on the basis of the wobbling signal period if the pre-pit signal absent period accords with the first predetermined period.

In accordance with the method described above, the light beam is irradiated on the storage medium, and the wobbling signal is detected. The wobbling signal is mixed with the pre-pit signal in only a predetermined period, and hence the period with pre-pit information mixed and the period with no pre-pit information mixed alternately appear. Then, pre-pit signal absent period is detected on the wobbling signal period basis. If the pre-pit signal absent period accords with the first predetermined period, the pre-pit signal present period comes next, and hence the pre-pit signal detection is enabled. As a result, it is ensured that the pre-pit detection is executed in the pre-pit signal present period, thereby avoiding erroneous detection of the noise component as a pre-pit signal.

The method may further include the steps of counting the second predetermined period; and starting a free-running at a period corresponding to the wobbling signal period in response to a first pre-pit detection after the pre-pit detection is enabled and counting a time passage from a start of the free-running.

With this arrangement, the free-running starts at a period corresponding to the wobbling signal period in response to a first pre-pit detection after the pre-pit detection is enabled, and the time passage from a start of the free-running is counted. Therefore, after the start of the free-running, the pre-pit signal present period and the pre-pit signal absent period are discriminated, and information can be correctly obtained from the pre-pit signal without the disturbance from the noise component.

The method may further include the steps of comparing a counting start timing by the counting step with a counting start timing by free-running starting step and calculating a discordance number of the counting start timings on the wobbling signal period basis; and restarting one of the counting step and the free-running starting step based on the discordance number. By this, if counting by the counting step or by the free-running starting step is started at improper timing, the erroneous timing may be corrected.

The method may further include the step of generating a timing signal for use in a pre-pit signal analysis in accordance with the time passage counted by the free-running starting step. Therefore, the timing signal free from the noise can be detected, and the accurate pre-pit detection can be carried out.

The method may further include the steps of generating a reference signal of a given frequency; and comparing the phase of the pre-pit signal with the phase of the reference signal to vary the frequency of the reference signal such that a phase difference between the pre-pit signal and the reference signal converges to be within a given range, the phase comparator being enabled only within a period when the timing signal is outputted. By this, the phase of the pre-pit signal always accords with the reference signal. In addition, since the phase comparison is enabled only during the period in which the timing signal is outputted, it can operate correctly without being disturbed by the noise component.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIGS. 18A to 18I are timing charts illustrating an operation of the phase comparator for the pre-pit signal shown in FIG. 17.

DETAILED DESCRIPTION OF THE PREFERRED EMBODIMENTS

The preferred embodiment of the present invention will now be described below with reference to the attached drawings.

Figure 1:
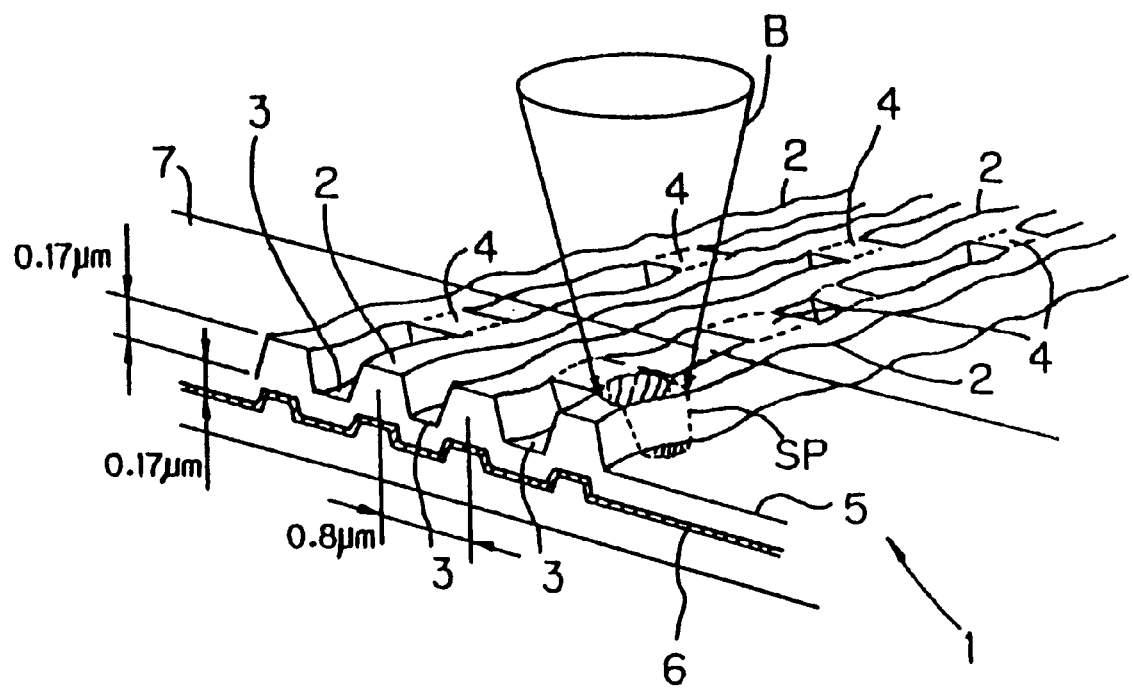
FIG. 1 is a perspective view illustrating the structure of a DVD-R.
Figure 2:
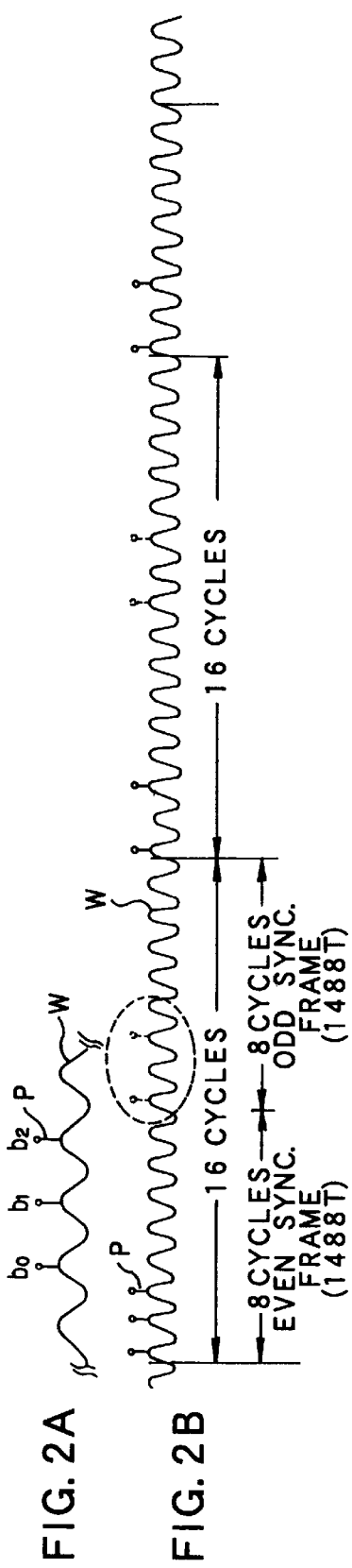
FIGS. 2A and 2B are diagrams illustrating the recording format of the DVD-R.

First of all, the description will be given of a DVD-R, serving as a storage medium, on which pre-information serving as recording control information is recorded in the form of pre-pits and rotation control information is recorded by wobbling the groove tracks at a predetermined frequency with reference to FIGS. 1 and 2.

The structure of the DVD-R for use in the embodiment of the present invention will be described with reference to FIG. 1. In FIG. 1, the DVD-R 1 is a dye-material type DVD-R having the dye layer 5. The DVD-R 1 is formed with the groove tracks 2 serving as information tracks and the land tracks 3 which are used as guide tracks to guide the light beam B along the groove tracks. The light beam B includes a laser beam functioning as a reproduction beam and a recording beam. The DVD-R 1 is further formed with a protection layer 7 to protect those tracks, and the gold deposited layer 6 which reflects the light beam B when the recorded information is read out. The land tracks 3 are formed, in advance, with the pre-pits 4 indicating the pre-information. In practice, the pre-pits 4 are formed before the DVD-R is put into the market. The groove tracks 2 are wobbled at the frequency corresponding to the rotation speed of the DVD-R. The recording of the rotation control information in the form of wobbled groove tracks 2 is also completed before the DVD-R 1 is put into the market, like the case of pre-pit formation mentioned above.

When recording main information on the DVD-R 1, an information recording apparatus described later in detail detects the wobbling frequency of the groove tracks 2 to obtain the rotation control information and controls the rotation of the DVD-R 1 at the given speed. In addition, the apparatus detects the pre-pits 4 to obtain the pre-information and sets the optimum output power of the light beam B serving as a recording light based on the pre-information thus obtained. Then, the apparatus obtains the address information indicative of the position on the DVD-R 1 to seek the recording position where the main information is to be recorded. Subsequently, the apparatus irradiates the light beam B on the surface of the DVD-R 1 such that its beam center traces the center line of the groove track 2, thereby recording main information by forming the information pits corresponding to the main information on the groove track 2. As seen in FIG. 1, the size of the light spot SP is controlled so as to cover not only the groove track 2 but also the neighboring land tracks 3 partially. The apparatus uses the light beam component reflected by the land track 3 in connection with the push-pull method to detect the pre-pits and obtain the pre-information, and uses the light beam component reflected by the groove track 2 to detect the wobbling signal and obtain the clock signal for use in the rotation control. The push-pull method uses photodetectors divided by a division line which is parallel to the rotation direction of the DVD-R 1.

Next, the description will be given of the recording format of the pre-information and the rotation control information pre-recorded on the DVD-R 1, by referring to FIGS. 2A and 2B. FIG. 2A shows a portion of the reproduction signal of the main information from which pre-pit information is obtained, and FIG. 2B shows the overall reproduction signal of the main information. The waveform of the wobbling signals shown in FIGS. 2A and 2B reflect the wobbled manner of the groove tracks 2 on which the main information is to be recorded. As seen in FIGS. 2A and 2B, the main information to be recorded on the DVD-R 1 is divided into sync frames serving as unit information. 26 sync frames constitute one recording sector, and 16 recording sectors constitute one ECC (Error Correction Code) block. One sync frame has a length (1488T) which is 1488 times longer than the unit length (T) corresponding to the bit interval prescribed by the recording format used in the recording of the main information. The groove track 2 is wobbled at a constant wobbling frequency $f_0=145$ kHz, which is determined such that one sync frame includes 8 waves (8 cycles), for all sync frames. The information recording apparatus described later detects the wobbling frequency $f_0$ to obtain the signal necessary to control the rotation of the spindle motor.

The pre-information is recorded in every sync frame. The pre-information is recorded in the form of the pre-pits according to the following two rules. First, one pre-pit 4, indicating the sync information of the pre-information, is necessarily recorded on the land track 3 at the position neighboring the position on the groove track 3 where the sync information in each sync frame of the main information is recorded. Second, one or two pre-pits 4, indicating contents of the pre-information (i.e., address information), follows the above-mentioned one pre-pit on the land track 3 neighboring the leading half portion of the sync frame other than the sync information recorded portion. It is noted that, in some cases, no pre-pit is formed in the leading half portion of the sync frame other than the sync information recorded portion, according to the contents of the pre-information to be recorded. Further, in some cases, one recording sector is formed with the pre-pits 4 only in the even numbered sync frames (hereinafter referred to as "EVEN sync frame"), or alternatively only in the odd numbered sync frames (hereinafter referred to as "ODD sync frame"). The reproduction signal of the pre-pit 4 is obtained as being multiplexed with the wobbling signal as seen in FIGS. 2A and 2B, and generally the EVEN sync frames include the pre-pit signal. However, if the pre-pits 4 formed closely to each other and hence the crosstalk takes place between the pre-pits signals, the pre-pits 4 are formed in the ODD sync frames as shown by the dotted circle in FIG. 2B. Alternatively, in some cases, the pre-pits 4 are basically formed in the ODD sync frames and moved to the EVEN sync frames according to need.

Figure 3:
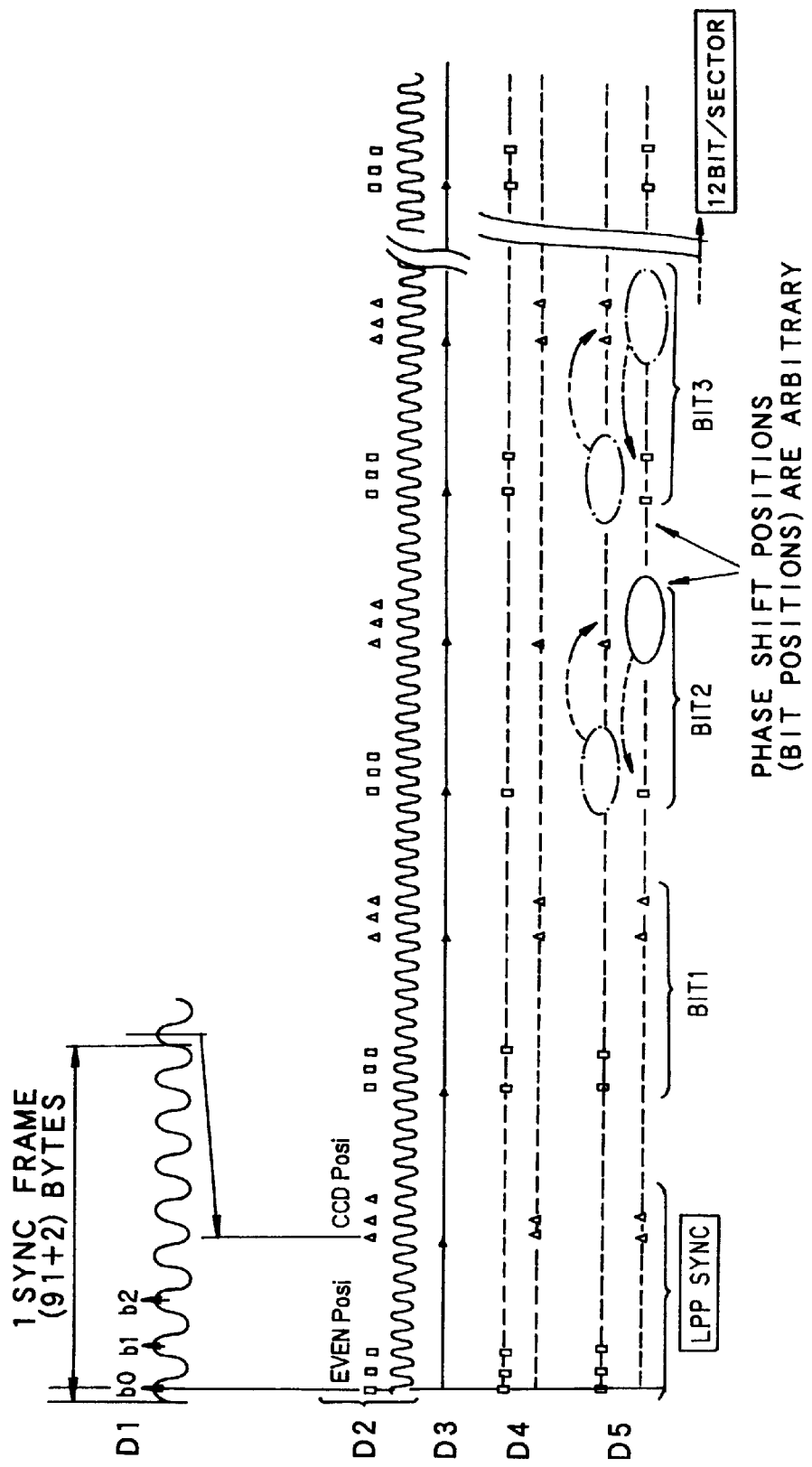
FIG. 3 is a diagram for explaining information indicated by pre-pit information.

As shown in FIG. 2A, the pre-pit signals are generated at the three positions of $b_0$, $b_1$, and $b_2$ in the 8-cycles (waves) of the wobbling signal. These pre-pit signals have following meanings determined dependently upon the generation positions. FIG. 3 is a diagram for explaining the meanings of the pre-pit information, wherein D1 shows the relationship between the wobbling signal and the pre-pit signal, D2 shows the presumed position of the pre-pit signal with respect to the wobbling signal, and D3 shows the partitioning of the 8-cycles of the wobbling signal. In addition, D4 shows examples of the pre-pit generated positions when the pre-pit formation position is not changed between the EVEN sync frame and the ODD sync frame, and D5 shows examples of the pre-pit generated positions when the pre-pit formation position is changed. In D2, D4 and D5, the triangles show the positions of the pre-pit signals generated in the ODD sync frames, and the rectangles show the positions of the pre-pit signals generated in the EVEN sync frames.

As shown by D2 and D3, the pre-pit signal is generated in the front three cycles of the 8-cycle wobbling signal, and is never generated in the following five cycles of the wobbling signal. Further, as appreciated by D4 and D5, the pre-pit signal at the $b_0$ position appears in every sync frame and always has the value "1", which functions as the sync bit for the synchronization of the pre-pit signal detection. The pre-pit signal at the position $b_1$ appears only in the head sync frames and always has the value "1". If the pre-pit signal is not generated at the position $b_1$, the following pre-pit signal at the position $b_2$ represents data such as address data. The pre-pit at the position $b_2$ indicates whether the subject sync frame is EVEN sync frame or ODD sync frame, if the pre-pit signal is present at the position $b_1$. Namely, as shown by D4 and D5, if the pre-pit signals are generated at positions of both $b_1$, and $b_2$, the frame is the head frame of EVEN sync frames. On the contrary, if the pre-pit signal is generated at the position $b_1$ but no pre-pit signal is generated at the position $b_2$, the frame is the head frame of ODD sync frames. Further, if no pre-pit signal is generated at the position $b_1$, the pre-pit signal itself indicates data value. Namely, the presence of the pre-pit signal at the position $b_2$ indicates the data "1" and the absence of the pre-pit signal at the position $b_2$ indicates the data "0". For instance, in D4 and D5 shown in FIG. 3, BIT1 represents data "1" and BIT2 represents data "0".

In this way, one sector includes the head sync frame (shown by "LPP SYNC" in FIG. 3), and the data sync frames BIT1 to BIT12. By decoding the pre-pit signal, sync information or data information can be obtained. The TABLE 1 shows the relationship between the meanings represented by the pre-pit combination patterns.

TABLE 1

| MEANING OF EACH BIT | $b_0$ | $b_1$ | $b_2$ |
|---|---|---|---|
| ALWAYS "1" AT SYNC BIT | 1 | * | * |
| HEAD OF EVEN SYNC FRAME | 1 | 1 | 1 |
| HEAD OF ODD SYNC FRAME | 1 | 1 | 0 |
| DATA "1" | 1 | 0 | 1 |
| DATA "0" | 1 | 0 | 0 |

Figure 4:
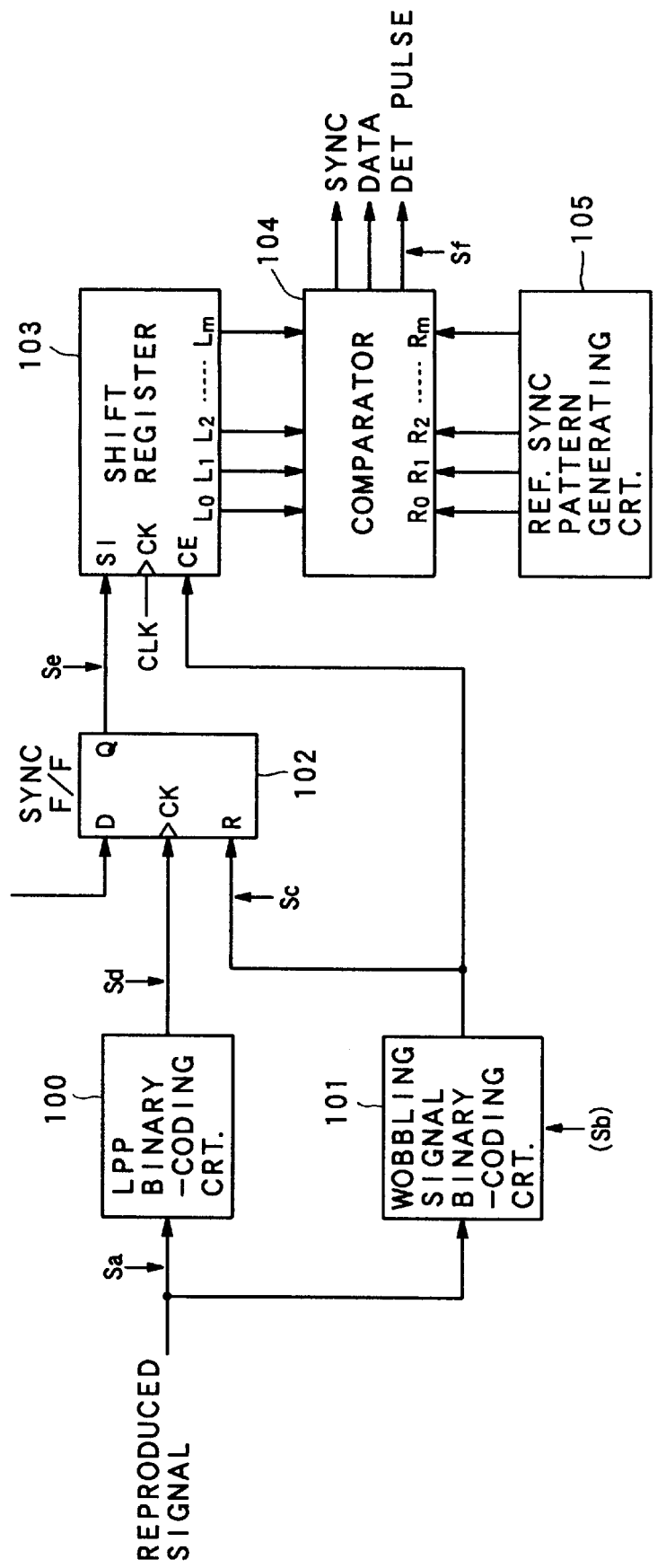
FIG. 4 is a block diagram illustrating a schematic configuration of a decoder of the pre-pit signal.

FIG. 4 shows the pre-pit signal decoder for use in the above described pre-pit signal decoding. The pre-pit signal decoder shown in FIG. 4 includes the LPP binary coding circuit 100 which extracts the pre-pit signal from the reproduced signal and applies binary coding thereto, and the wobbling signal binary coding circuit 101 which extracts the wobbling signal from the reproduced signal and applies binary coding thereto. The binary pre-pit signal (hereinafter referred to as "binary LPP") outputted from the LPP binary coding circuit 100 and the binary wobbling signal, indicating the falling edges of the wobbling signal, outputted from the binary coding circuit 101 are supplied to the synchronization flip-flop 102. With data "1" being inputted to the data input terminal of the flop-flop 102, the data is latched at the timings of the pre-pit signal generation and supplied to the shift register 103. The comparator 104 compares the latched data with the reference patterns which are produced based on the decoding result shown in the above TABLE 1 and stored in the reference sync pattern generating circuit 105. When the comparator detects the coincidence, sync information or data may be obtained.

Figure 5:
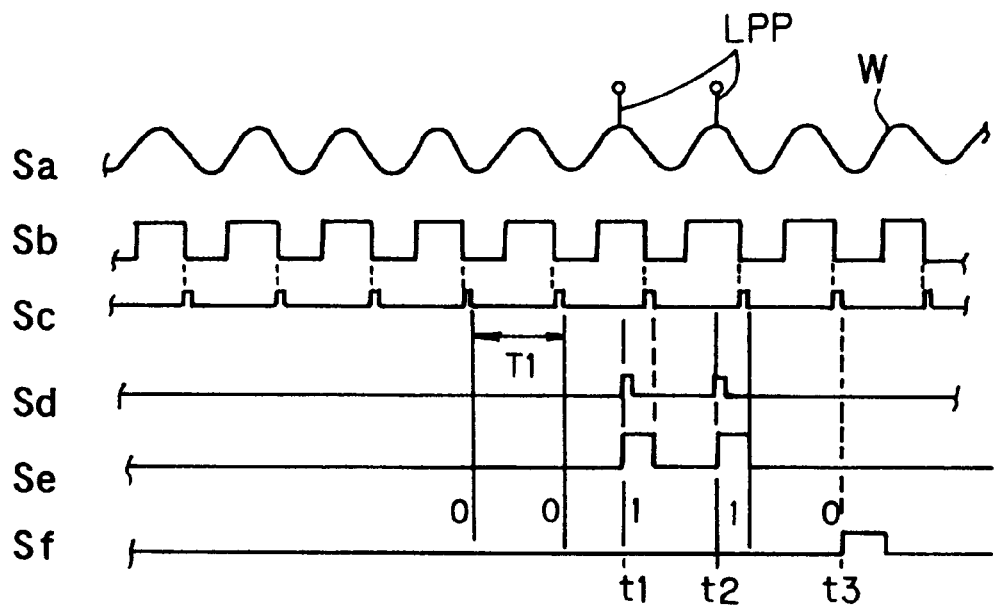
FIG. 5 is a timing chart illustrating signals appearing in the decoder shown in FIG. 4.

FIG. 5 shows signals Sa to Sf appearing in the decoder shown in FIG. 4. Since the Q-output of the flip-flop 102 is reset at every period T1 of the wobbling signal, the shift register 103 receivers "0" if no pre-pit is detected. If the pre-pits are detected, e.g., at the times t1 and t2 in FIG. 5, the Q-output of the flip-flop 102 becomes "1", which is supplied to the shift register 103. The comparator 104 outputs the detection pulse in the 12th cycle counted from the sync bit. In the example in FIG. 5, data "110" is decoded, from which it is recognized that the current frame is the head frame of ODD sync frames.

Figure 6:
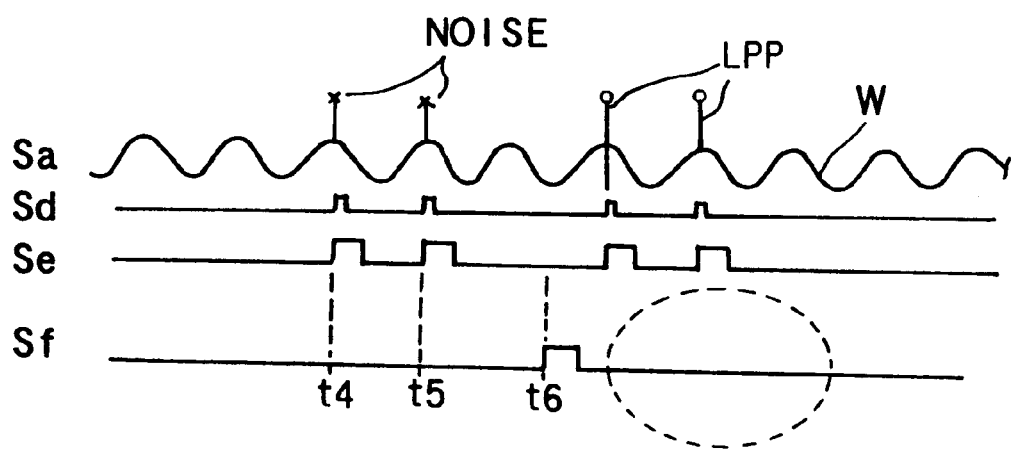
FIG. 6 is a timing chart illustrating the signals appearing in the decoder shown in FIG. 4 when noise is mixed.

However, if there is crosstalk from other pre-pits 4 formed on the DVD-R 1, or if there is dust or the like on the surface of the DVD-R 1, the noise components would be mixed in the wobbling signal as seen in FIG. 6. In that case, the pre-pit decoder shown in FIG. 4 may erroneously detect those noise components as pre-pit signals as shown in FIG. 6, wherein the detection pulse is generated, in error, at the time t6, and no detection pulse is generated in the dotted circle area where the pre-pit signals actually exist.

In this respect, according to the embodiment of the present invention, the pre-pit signals are detected in the front three cycles of the wobbling signal only when following five successive cycles of wobbling signal, with no pre-pit included, are detected within the 8-cycle period of the wobbling signal. Namely, the pre-pit detection is made only at the correct positions where the pre-pit signals appears in theory, thereby avoiding the erroneous detection of the pre-pits even in the presence of the noise component.

Next, the above mentioned improved pre-pit detection will be described below in more detail. First, the information recording apparatus, which performs the improved pre-pit detection described above, will be described with reference to FIGS. 7 to 16. It is noted that the information recording apparatus described below records digital information transmitted from a host computer on the DVD-R 1. In the following description, it is assumed that the DVD-R 1 is formed, in advance, with the pre-pits 4 including the address information and the wobbled groove tracks 2, and that the recording apparatus detects the pre-pits 4 to obtain the address information on the DVD-R 1, and then finds out the recording position based on the address information.

Figure 7:
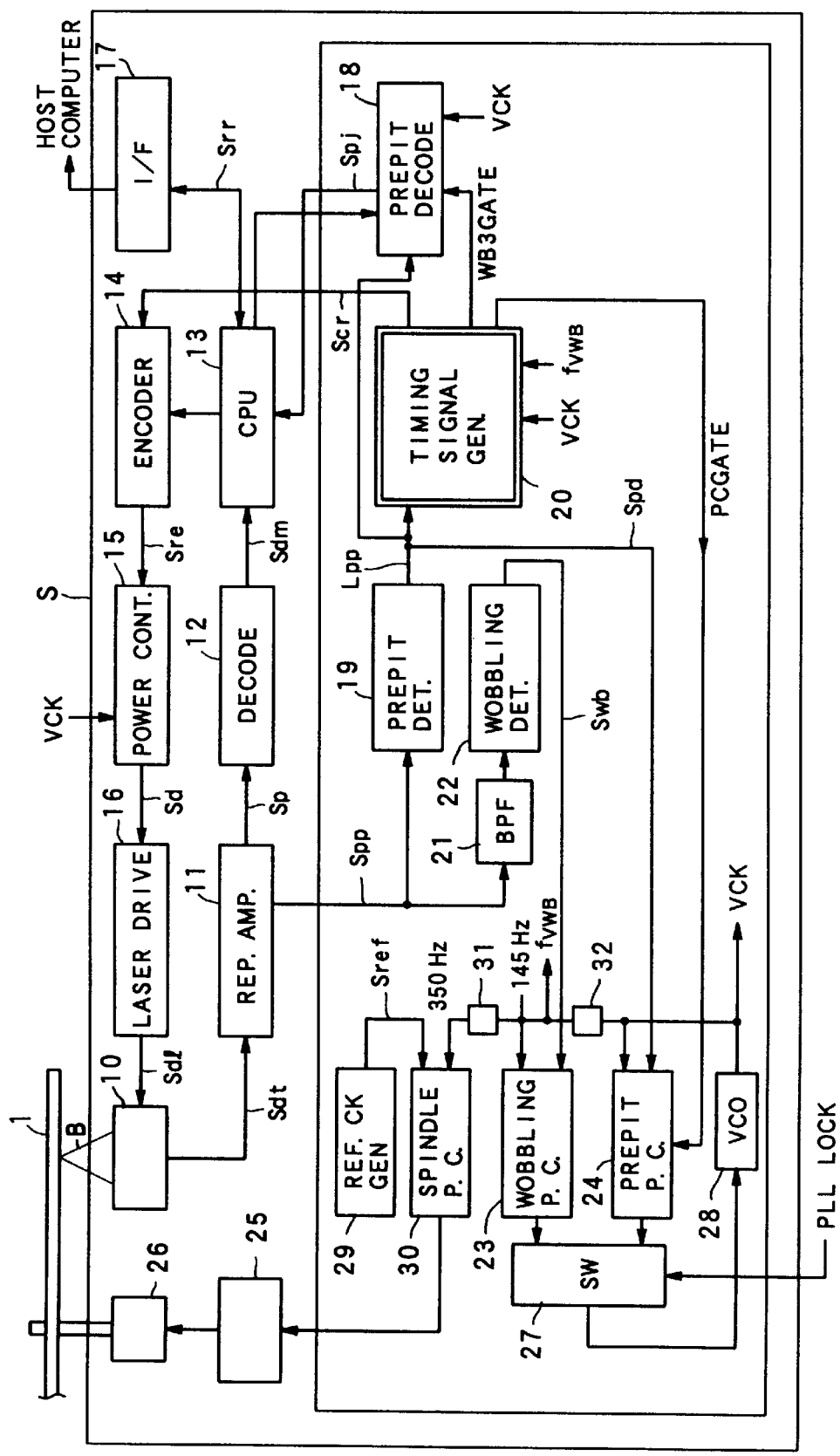
FIG. 7 is a block diagram illustrating the schematic configuration of an information recording apparatus including a pre-pit information detecting device according to the present invention.

As shown in FIG. 7, the information recording apparatus S includes the pickup 10, the reproduction amplifier 11, the decoder 12, the CPU 13, the encoder 14, the power control circuit 15, the laser driving circuit 16, the pre-pit signal decoder 18, the pre-pit signal detector 19, the timing signal generator 20 for the pre-pit signal decoding, the BPF (Band Pass Filter) 21, the wobbling signal detector 22, the phase comparator 23 for wobbling signal, the phase comparator 24 for the pre-pit signal, the spindle driver 25, the spindle motor 26, the switch 27, the VCO (Voltage Controlled Oscillator) 28, the reference clock generator 29, the phase comparator 30 for the spindle motor, and the dividers 31 and 32. The information recording apparatus S receives the digital signal Srr to be recorded on the DVD-R 1 from the external host computer via the interface 17.

Next, the overall operation of the information recording apparatus S will be described.

The pickup 10 includes a laser diode, polarization beam splitters, an objective lens and photodetectors, which are not shown. The pickup 10 irradiates the light beam B on the information recording surface of the DVD-R 1 based on the drive signal Sdl, and detects the pre-pits 4 and the wobbling signal of the groove tracks 2, using the radial push-pull method, from the reflected light beam, so as to record the digital information Srr. If the DVD-R 1 has already been recorded with digital information, the pickup also detects the digital information using the reflected light beam B. The reproduction amplifier 11 amplifies the pickup detection signal Sdt which is outputted by the pickup 10 and includes information relating to the pre-pits 4 and the wobbling signal of the groove tracks 2, and outputs the pre-information signal Spp corresponding to the pre-pits 4 and the wobbling signal of the groove tracks 2 as well as the amplified signal Sp corresponding to the digital information recorded in advance. The decoder 12 applies the 8-16 demodulation and the de-interleaving onto the amplified signal Sp to decode it, and outputs the demodulated signal Sdm to the CPU 13.

The pre-pit signal detector 19 detects the pre-pit signal from the pre-information signal Spp and supplies the pre-pit detection signal Spd, which is a pulse signal, to the pre-pit signal decoder 18, the phase comparator 24 and the timing signal generator 20. The wobbling signal detector 22 receives the wobbling signal component that the BPF 21 extracts from the pre-information signal Spp, compares the wobbling signal component with a predetermined reference value using the internal comparator, and outputs the pulse signal indicating the time period in which the amplitude level of the wobbling signal component exceeds the reference value. Namely, the wobbling signal detector 23 converts the wobbling signal component into the pulse sequence and supplies it to the phase comparator 23 as the binary wobbling signal Swb.

The phase comparators 23 and 24, the switch 27, the VCO 28 and the divider 32 constitutes, in combination, a so-called PLL (Phase Locked Loop) circuit, which generates the recording clock signal VCK synchronized with the binary wobbling signal Swb thus inputted. When the synchronization is established, the switch 27 is turned over to supply the recording clock signal VCK, which is synchronized with the pre-pit detection signal Spd, to the timing signal generator 20, the pre-pit signal decoder 18 and the power control circuit 15. The recording clock signal VCK is supplied via two dividers 32 and 31 to the phase comparator 30, which makes the phase-comparison of the input signal with the reference clock signal Sref, including the reference frequency component of the rotation speed of the DVD-R 1, supplied from the reference clock generator 29 and outputs the difference signal to the spindle motor 26 via the spindle driver 25 as the rotation control signal. By this, the spindle servo control is executed for the spindle motor 26 and the DVD-R 1 rotates at the rotation speed in accordance with the frequency and the phase of the reference clock signal Sref.

The interface 17 performs the interfacing operation to pass the digital information Srr to the information recording apparatus S under the control of the CPU 13, and supplies the digital information Srr to the encoder 14 via the CPU 13. By this, the encoder 14 applies the ECC generation, the 8-16 modulation and the scrambling processing onto the digital information Srr using the sync signal Scr for the encoding, supplied from the timing signal generator 20, as the timing signal, so as to produce the modulated signal Sre, and then supplies it to the power control circuit 15. Thereafter, the power control circuit 15 carries out the waveform conversion (so-called write strategy processing) of the modulated signal Sre based on the clock signal VCK to improve the information pit shape to be formed on the DVD-R 1, and outputs the converted signal as the recording Sd to control the laser diode (not shown) in the pickup 10. The laser driving circuit 16 drives the laser diode on the basis of the recording signal Sd to output the laser drive signal Sdl for emitting the light beam B.

The CPU 13 obtains the pre-information based on the pre-information decode signal Spj which is outputted by the pre-pit signal decoder 18 based on the decode timing signal WB3GATE, and controls the recording of the digital information Srr on the DVD-R 1 at the position indicates by the address information included in the pre-information. Simultaneously, the CPU 13 outputs the reproduction signal corresponding to the digital signal already been recorded on the DVD-R 1 on the basis of the demodulated signal Sdm to the external device, and totally controls the information recording apparatus S.

Figure 8:
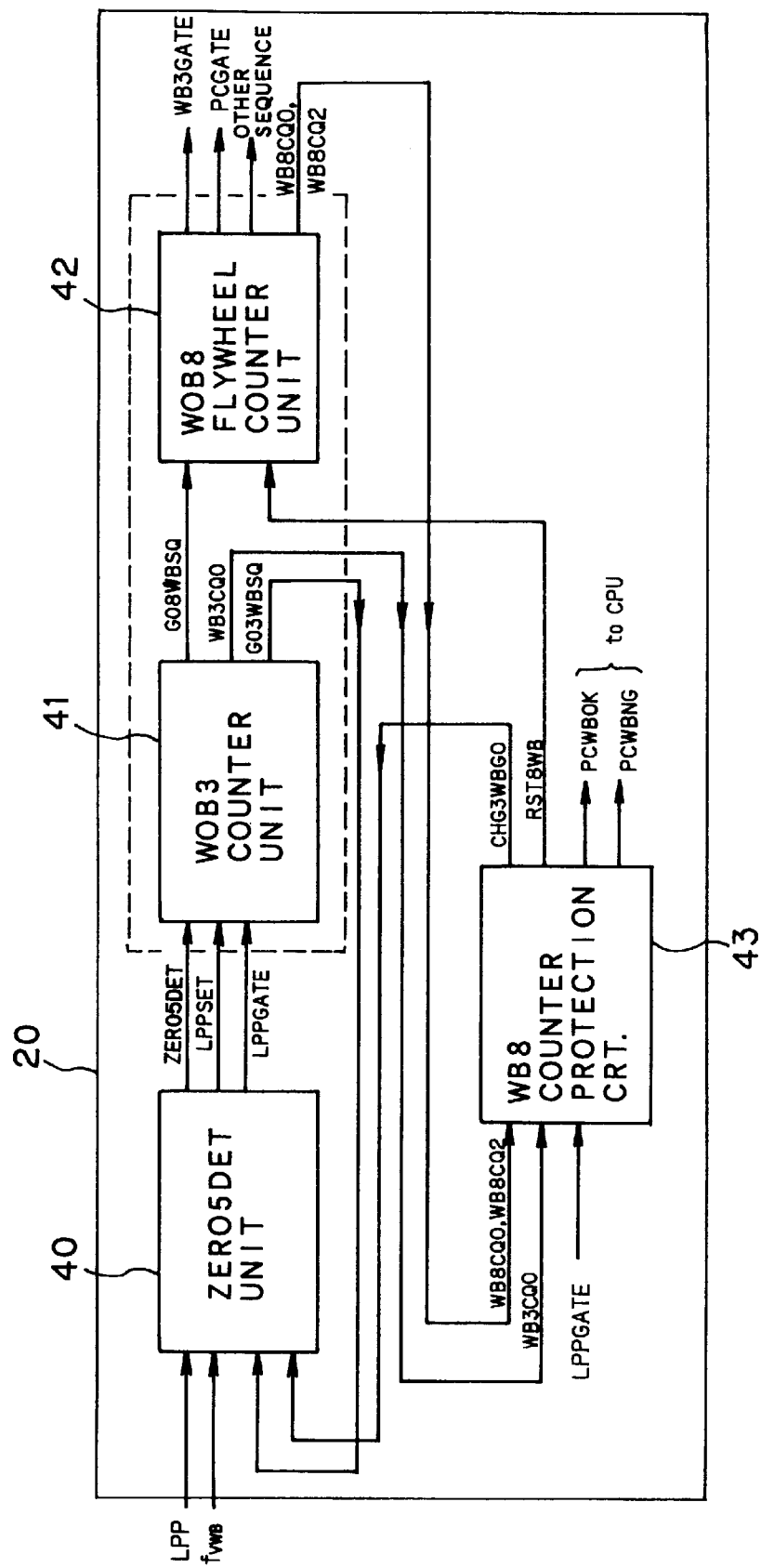
FIG. 8 is a block diagram illustrating the schematic configuration of the pre-pit information detecting device according to the present invention.
Figure 9:
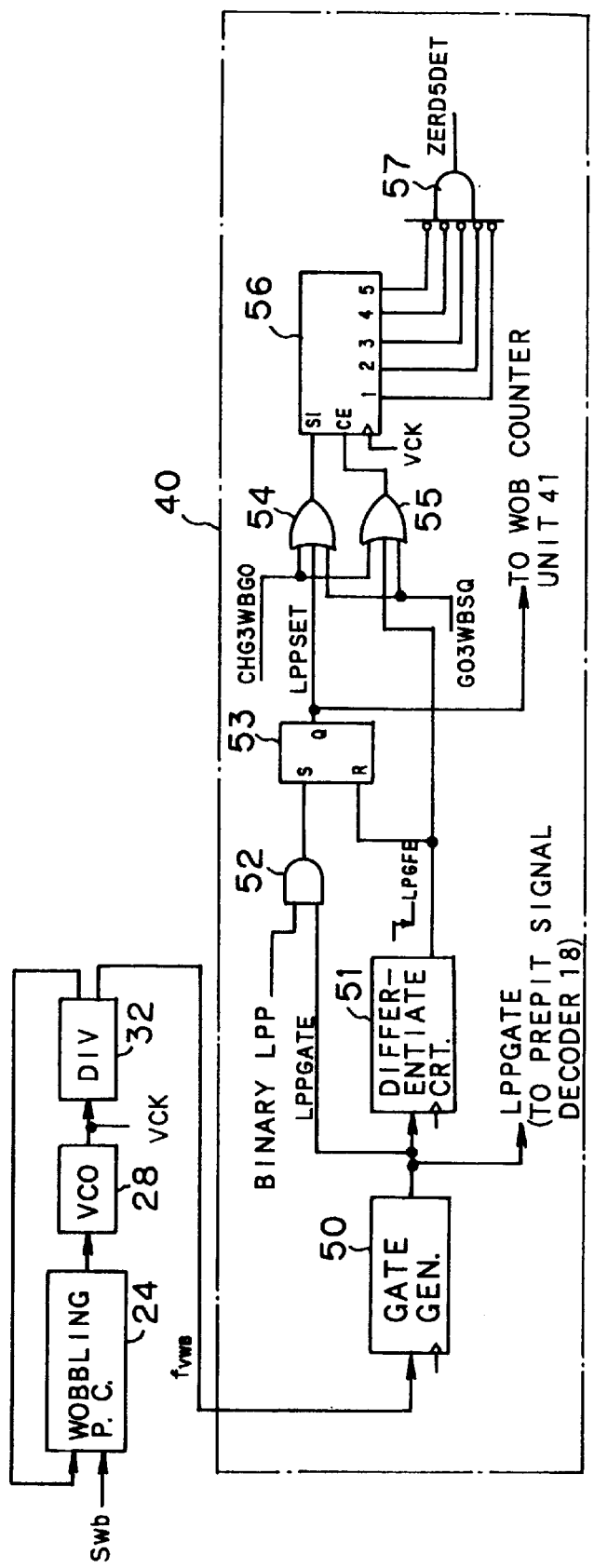
FIG. 9 is a block diagram illustrating the schematic configuration of the ZEO5DET unit.

Next, the description will be given of the detailed configuration and operation of the timing signal generator 20 for the pre-pit signal decoding, with reference to FIGS. 8 to 10. FIG. 8 is a block diagram showing the detailed configuration of the timing signal generator 20 for the pre-pit signal decoding. As shown in FIG. 8, the timing signal generator 20 includes the ZERO5DET unit 40, the WOB3 counter unit 41, the WOB8 flywheel counter unit 42, and the WOB8 counter protection circuit 43. The ZERO5DET unit 40 detects that the wobbling signal with no pre-pit signal mixed is successively inputted for 5 cycles. The WOB3 counter unit 41 counts the 3 cycles of the wobbling signal, in which the pre-pit signals would be mixed, from the head of the frame, and outputs a predetermined control signal. The WOB8 flywheel counter unit 42 counts the wobbling signals for 8 cycles from the head of the wobbling signal, and outputs a predetermined control signal. The WOB8 counter protection circuit 43 detects the discordance of the WOB3 counter unit 41 and the WOB8 flywheel counter unit 42 to output a predetermined control signal.

Next, the detailed configuration and the operation of the ZERO5DET unit 40 will be described with reference to the block diagram shown in FIG. 9 and the flowchart shown in FIG. 10. The ZERO5DET unit 40 includes, as shown in FIG. 9, the gate generation circuit 50, the differentiating circuit 51, the AND gate 52, the flip-flop 53, the OR gate 54 and 55, the shift register 56 and 5-inputs NAND circuit 57. The gate generation circuit 50 receives the $f_{WWB}$ signal, which is generated by dividing the recording clock signal VCK and whose phase is synchronized with the binary wobbling signal Swb by means of the PLL circuit constituted by the phase comparator 24, the VCO 28 and the divider 32. The ZERO5DET unit 40 detects the time period in which no pre-pit signal appears based on the $f_{WWB}$ signal, and converts the time period to the corresponding number of the wobbling signal cycles. Then, the ZERO5DET unit 40 outputs the ZERO5DET signal when the number of the detected wobbling signal cycle reaches five.

Figure 10:
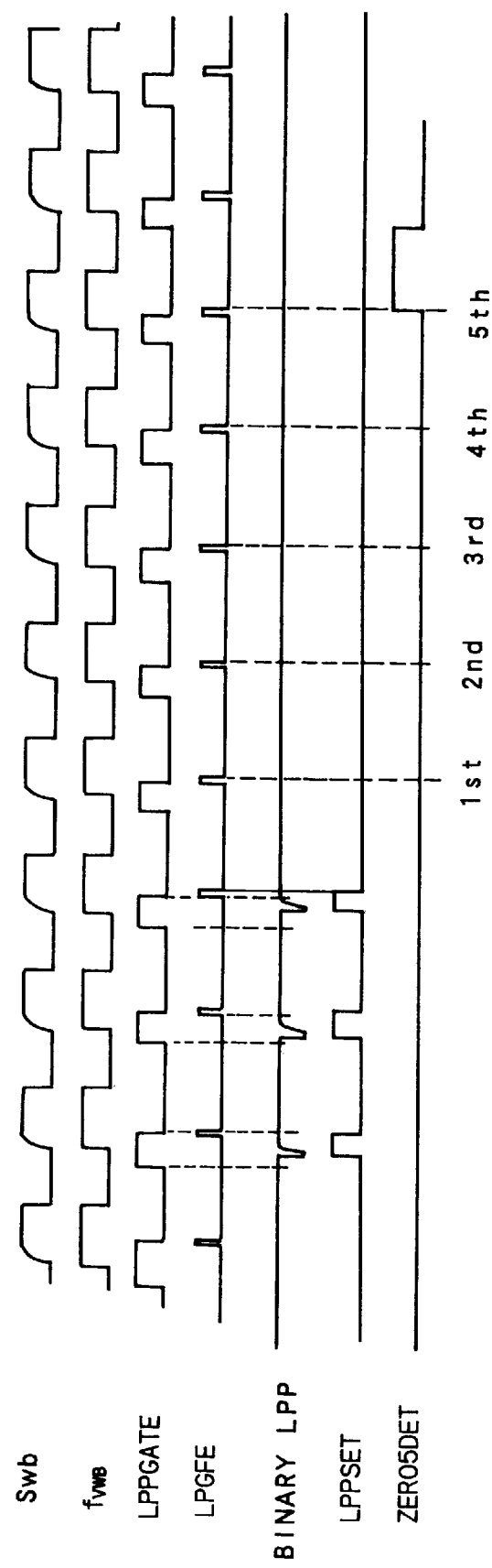
FIG. 10 is a timing chart illustrating the operation of the ZERO5DET unit.

First, the gate generation circuit 50 generates the LPPGATE signal shown in FIG. 10 on the basis of the $f_{WWB}$ signal. The LPPGATE signal indicates the presumed period in which the pre-pit signal mixed in the wobbling signal is presumed to appear. The LPPGATE signal becomes ON state from a predetermined period after the falling-down of the $f_{WWB}$ signal, and become OFF state after the presumed period has passed. In this embodiment, the presumed period is set to the time period corresponding to 65 clocks of the recording clock signal VCK. The gate generation circuit 50 or the other circuits described later uses the pre-pit signals detected only during the ON state of the LPPGATE signal to detect the presence and absence of the pre-pit signal or to perform decoding. Accordingly, even if a noise component having an amplitude like that of the pre-pit signal at the timing when the pre-pit does not appear in theory, the erroneous detection of the noise as the pre-pit signal may be avoided. The LPPGATE signal is outputted to the pre-pit signal decoder 18 shown in FIG. 7 as well as the differentiating circuit 51 and the AND circuit 52 shown in FIG. 9. The differentiating circuit 52 differentiates the rising of the LPPGATE signal to produce the LPGFE signal shown in FIG. 10. This LPGFE signal is inputted to the reset input terminal R of the flip-flop 53. The LPPGATE signal is inputted to the AND gate 52 which also receives the binary LPP signal outputted by the pre-pit signal detector 19 shown in FIG. 7. Accordingly, as shown in FIG. 10, if the binary LPP signal is outputted during the LPPGATE signal being ON state, the output of the AND gate becomes "1". Since this output is inputted to the set input terminal of the flip-flop 53, the LPPSET signal outputted from the Q-terminal becomes ON state. Then, the flip-flop 53 is set by the LPGFE signal indicating the falling timing of the LPPGATE signal, and hence the LPPSET signal becomes OFF state. In this way, the LPPSET signal, which indicates the appearance of the pre-pit signal, is designed to have a predetermined width for use in the signal processing by the gate circuit.

The LPPSET signal is supplied to the input terminal SI of the shift register 56 via the OR gate 54, and the LPGFE signal is supplied to the clock enable terminal CE, which permits the operation of the shift register 56, via the OR gate 55. Further, the recording clock VCK is supplied to the clock input terminal of the shift register 56. The shift register 56 sets the value of the LPPSET signal at the rising timing of the LPPGATE signal, and then shifts the values. Therefore, if the binary LPP signal is outputted for three times, all the outputs from the first, second and third output terminal of the shift register 56 become "1". As a result, the output of the 5-inputs NAND circuit 57 connected to the output terminal of the shift register 56, i.e., the ZERO5DET signal becomes OFF state.

However, if the OFF state of the LPPSET signal continues for 5 cycles of the LPGFE signal, i.e., 5 cycles of the wobbling signal, the shift register 56 outputs "0" from all output terminals. Therefore, the output of the 5-inputs NAND gate becomes "1"and the ZERO5DET signal becomes ON state as shown in FIG. 10. When the ZERO5DET signal becomes ON state, the WOB3 counter sets the GO3WBSQ signal to ON state, and hence the value "1" is set to the input terminal SI of the shift register 56 via the OR gates 54 and set to the clock enable terminal CE via the OR gate 55. Thus, the outputs from the shift register 56 become all "0" at the timing of the recording clock VCK, and the ZERO5DET signal becomes OFF state as shown in FIG. 10. The GO3WBSQ signal maintains the ON state until the WOB3 counter finishes counting three cycles of the wobbling signal at the rising timings of the LPPGATE signal after the ZERO5DET signal becomes ON state, and changes to the OFF state after finishing the counting. Therefore, the setting and shifting of the OFF state of the LPPSET signal by the shift register 56 necessarily begins from the fourth cycle of the wobbling signal after the LPPSET signal becomes ON state for the first time. Consequently, the ZERO5DET signal becomes ON state when the wobbling signal with no pre-pit signal is detected successively for five cycles, regardless of the pre-pit appearing pattern. Although the CHG3WBGO signal is also inputted to the shift register 56 via the OR gates 54, 55 as shown in FIG. 9, the detail of this signal will be described later. As described above, the ZERO5DET unit 40 outputs the ZERO5DET signal which is the detection signal of successive five cycles of the wobbling signal with no pre-pit signal mixed, the LPPSET signal which indicates the appearance of the pre-pit signal, and the LPPGATE signal which indicates the time period in which the pre-pit may appear. Those signals are inputted to the WOB3 counter at the following stage, as shown in FIG. 8.

Figure 11:
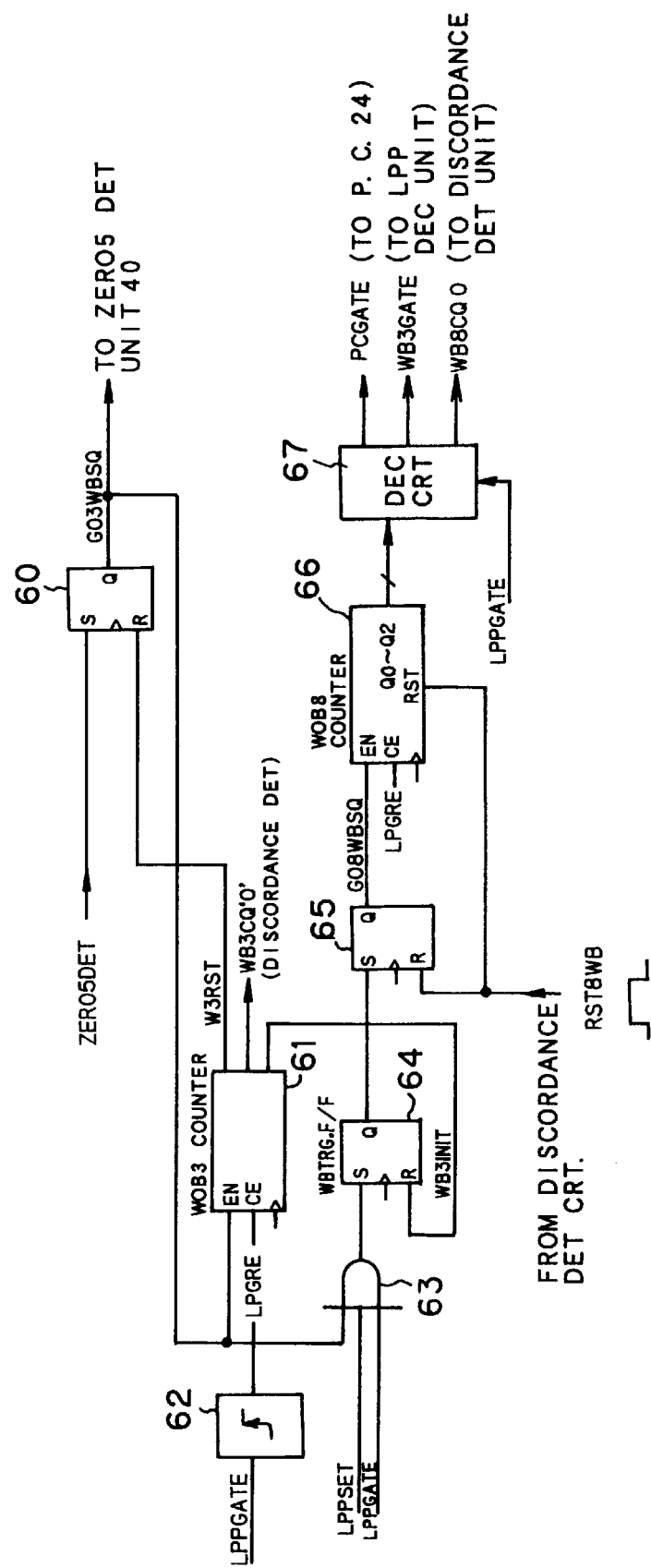
FIG. 11 is a block diagram illustrating the schematic configuration of the WOB3 counter unit and the WOB8 counter unit.

Next, the description will be given of the WOB3 counter unit 41 and the WOB flywheel counter unit 42. As shown in FIG. 11, the WOB3 counter unit 41 includes the flip-flop 60, the WOB3 counter 61, the differentiating circuit 62, the AND circuit 63, the flip-flop 64 for triggering the WOB8 counter 66 and the flip-flop 65 for resetting the WOB8 counter 66. The WOB8 flywheel counter 42 includes the WOB8 counter 66 and the decode circuit 67. The WOB3 counter 41 receives, from the ZERO5DET unit 40, the ZERO5DET signal, the LPPSET signal, and the LPPGATE signal. This is because that the WOB3 counter unit 41 has the function to counts the three cycles of the wobbling signal, to which the pre-pit signal may be mixed, after the successive five cycles of the wobbling signal with no pre-pit signal mixed, and to generate the trigger signal for the WOB8 flywheel counter 42, described below, at the input timing of the initial pre-pit signal, serving as the sync bit.

Figure 12:
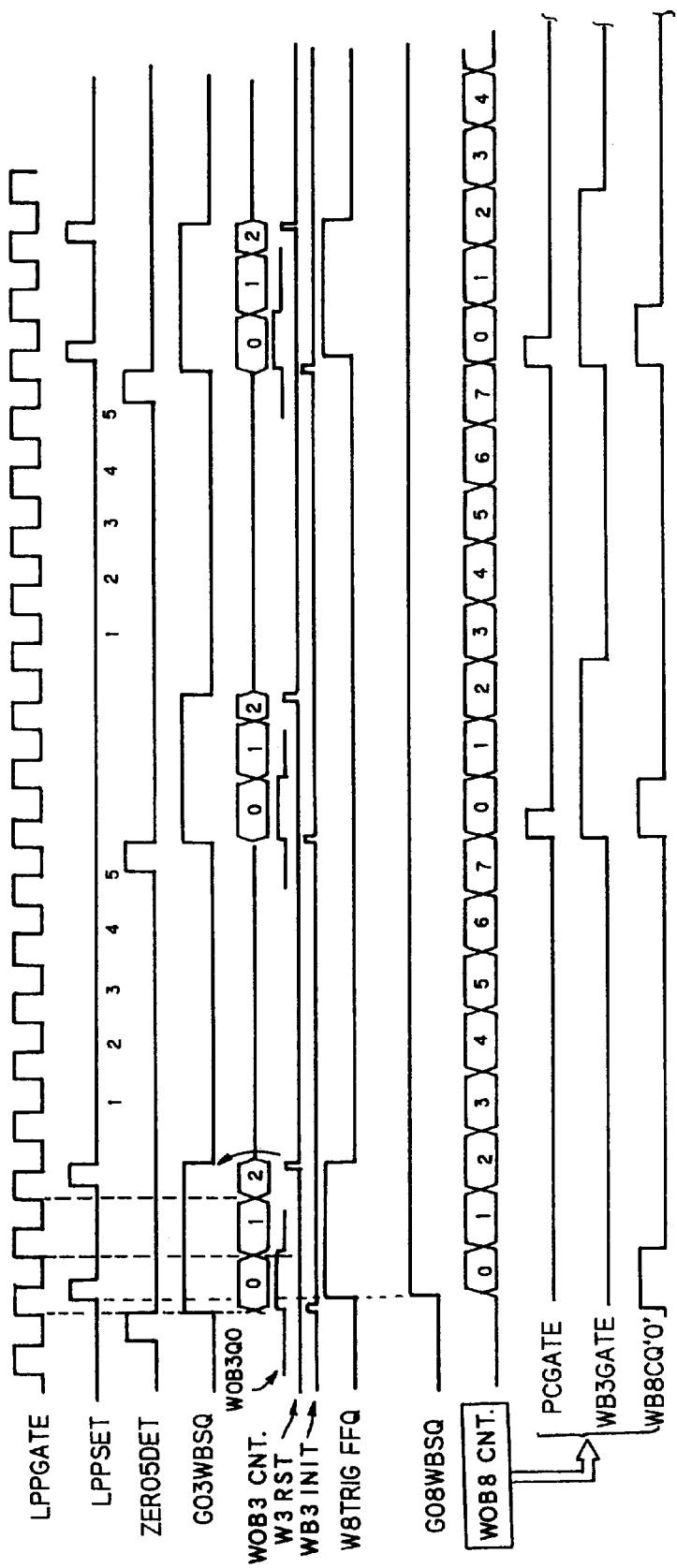
FIG. 12 is a timing chart illustrating the operation of the WOB3 counter unit and the WOB8 counter unit.

The ZERO5DET signal is inputted to the set terminal of the flip-flop circuit 60. By this, the GO3WBSQ signal outputted from the Q-terminal of the flip-flop circuit 60 becomes ON state at the rising timing of the LPPGATE signal which is synchronized with the rising timing of the recording clock signal VCK. As mentioned above, the GO3WBSQ signal allows the output signal of the shift register to be "1" to make the ZERO5DET signal OFF state, and is inputted to the enable terminal of the WOB3 counter 61 to enable the counting operation of the WOB3 counter 61. The clock enable signal of the WOB3 counter 61 becomes ON state by the input of the LPGRE signal, which is the rising signal of the LPPGATE signal generated by the differentiating circuit 62, and hence the WOB3 counter 61 counts the number of the risings of the LPPGATE signal. As shown in FIG. 12, the WOB3 counter 61 makes the WOB3Q0 signal ON state during the time period when the count value is equal to the initial count value "0", and make the W3RST signal ON state after counting up three risings of the LPPPGATE signal.

The W3RST signal is inputted to the reset terminal of the flip-flop 50, and makes the GO3WBSO signal OFF state. On the other hand, by the GO3WBSQ signal changing to OFF state, the ZERO5DET unit 40 restarts counting 5 cycles of the wobbling signal with no pre-pit signal. Accordingly, the detection of the five cycles and the counting of three cycles of the LPPGATE signal, i.e., three cycles of the wobbling signal, by the WOB3 counter 61 take place alternately. The VVB3INIT signal is supplied to the reset terminal of the flip-flop 64 which generates the trigger signal for initiating the counting by the WOB8 counter 66. Since the trigger signal is made ON state when the set terminal of the flip-flip 64 receives "1", it is the timing at which all inputs to the AND circuit 63 become "1", i.e., the timing at which the LPPSET signal changes to ON state while the GOWB3SQ signal and the LPPGATE signal are both ON state. When the trigger signal becomes ON state, the GO8WBSQ signal outputted by the Q-output terminal of the flip-flop 65 becomes ON state and inputted to the enable terminal of the WOB8 counter 66, thereby to start the counting operation by the WOB8 counter 66. Therefore, the trigger signal becomes ON state to make the WOB8 counter 66 operate at the timing when the LPPSET signal becomes ON state, and becomes OFF state at the timing when the 3 cycles of the wobbling signal is counted up, thereby to enable the restart of the WOB8 counter 66 in synchronism with timing when the LPPSET signal changes to ON state. The restart of the WOB8 counter 66 and the WB3CSQ signal will be described in more detail later. As described above, the WOB3 counter 41 has a function to determine the detection start timing of 5 cycles of the wobbling signal with no pre-pit signal by the ZERO5DET unit 40 and the count start timing by the WOB8 counter 66.

Next, the WOB8 flywheel counter unit 42 will be described. The WOB8 counter 66 in the WOB flywheel counter unit 42 starts counting operation when the GO8WBSQ signal becomes ON state, however, the flip-flop 65 outputting the GO8WBSQ signal does not change the state of the output unless the discordance detection circuit supplies the RST8WB signal of ON state. The GO8WBSQ signal becomes ON state when the 5 cycles of the wobbling signal with no pre-pit signal are detected and further the LPPSET signal becomes ON state during the ON state period of the LPPGATE signal, and hence the WOB8 counter 66 starts counting at the timing when the initial pre-pit, which is sync bit, appears and continues counting unless the discordance detection, described later, is carried out. Since the rising signal of the LPPGATE signal is inputted to the chip enable terminal of the WOB8 counter 66, the WOB8 counter 66 accurately continues counting the LPPGATE signal, i.e., the wobbling signal, from the timing of the initial sync bit. The output of the WOB8 counter 66 is inputted to the decode circuit 67, which carries out decoding at the timing of the LPPGATE signal and outputs the PCGATE signal, the WB3GATE signal and the WB8CQ0 signal. The PCGGATE signal becomes ON state during a predetermined time period at a predetermined position, and permits the phase comparator 24 for the pre-pit signal to operate during its ON state period. The WB3GATE signal is supplied to the pre-pit decoder 18 and is made ON state during the initial three cycle period of the wobbling signal with pre-pit signal. The WB8CQ0 signal is used in the discordance detection described later. As described above, the signals necessary for the pre-pit signal detection and the decoding are obtained based on the output by the WOB8 counter which count start timing does not change in real time basis. Therefore, if the wobbling signal includes noise component, the pre-pit signal can be accurately detected and decoded irrespective of the presence of the noise component.

Figure 13:
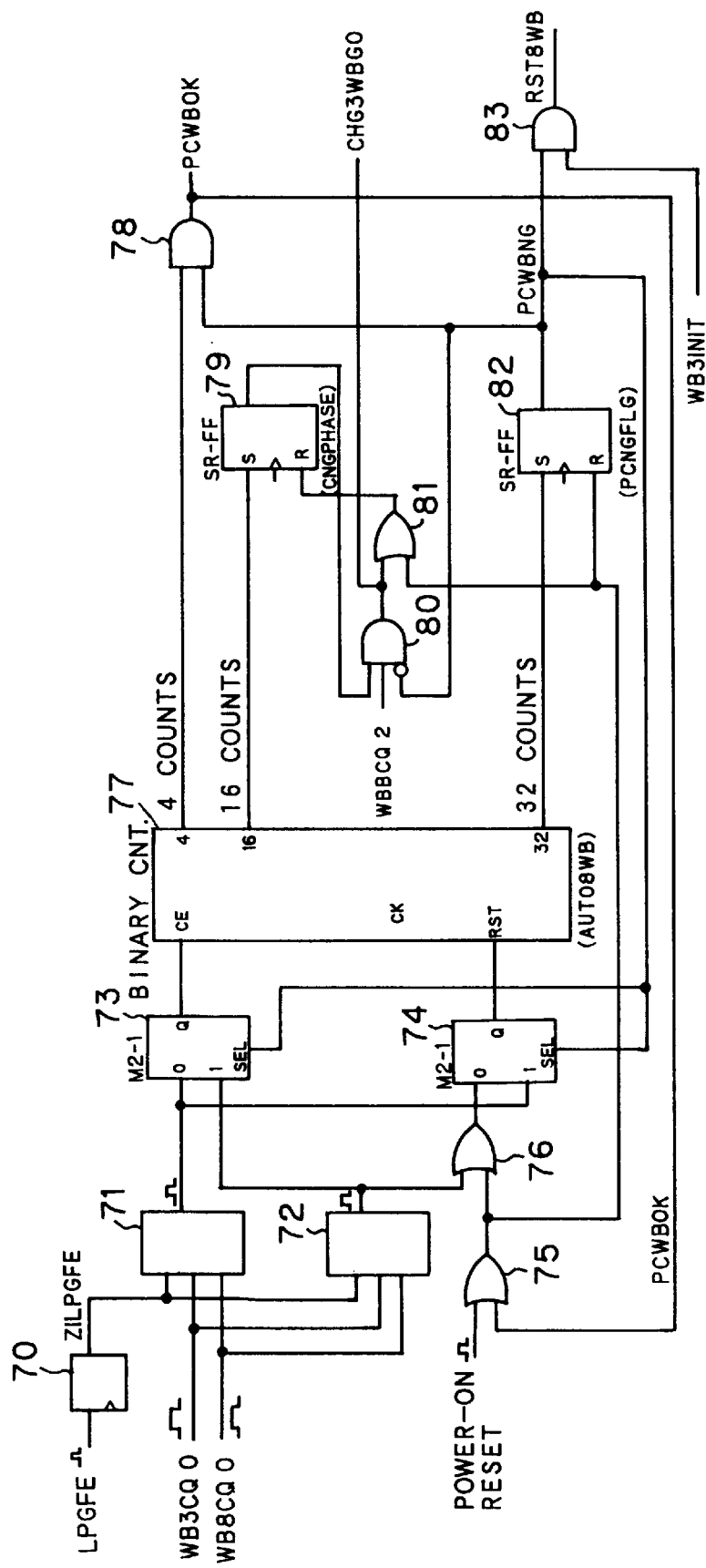
FIG. 13 is a block diagram illustrating the WB8 counter protection circuit.
Figure 14:
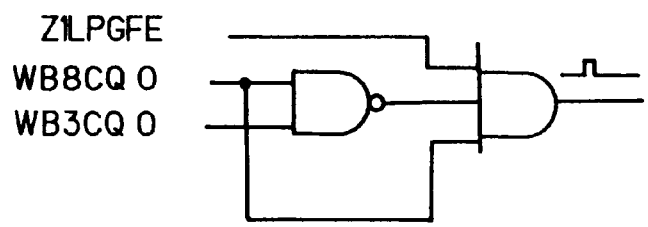
FIGS. 14A and 14B are circuit diagrams illustrating a discordance circuit and an accordance circuit, respectively.
Figure 14:
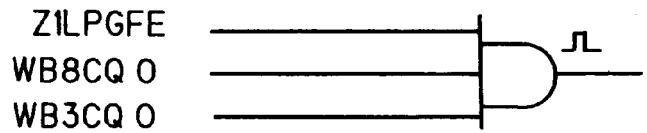

Next, the configuration and the operation of the WOB8 counter protection circuit 43 will be described. As shown in FIG. 13, the WOB8 counter protection circuit 43 includes the latch 70, the discordance detection circuit 71, the accordance detection circuit 72, the selectors 73, 74, the OR gates 75, 76, 81, the binary counter 77, the AND gates 78, 80, 83, and the SR-FF flip-flops 79, 82. Both the WB3CQ0 signal outputted from the WOB3 counter 61 and the WB8CQ0 signal outputted from the WOB8 counter 66 become ON state when the counter value is "0", and change to ON state at the same timing in the normal operation. Accordingly, the output of the discordance detection circuit 71, configured as shown in FIG. 14A becomes "0", and the output of the accordance detection circuit 72, configured as shown in FIG. 14B, becomes "1". At the power-on timing, the OR gate 75 outputs "1", and the flip-flop 82 outputs "0". The PCWBNG signal, which indicates that the pre-pit signal does not exist at correct position in the 8 cycles of the wobbling signal, becomes OFF state, and the 0-input terminals of the selectors 73 and 74 become active. Accordingly, at the power-on timing, the output of the discordance detection circuit 71 is inputted to the clock enable terminal of the binary counter 77 via the selector 73 so that the number of discordance is counted. Then, the output of the accordance detection circuit 72 is inputted to the reset terminal of the binary counter 77 via the flip-flop 74. Namely, in the normal operation, the output of the accordance detection circuit 72 is always kept ON state, and hence the count value of the binary counter 77 is always in the reset state.

Figure 15:
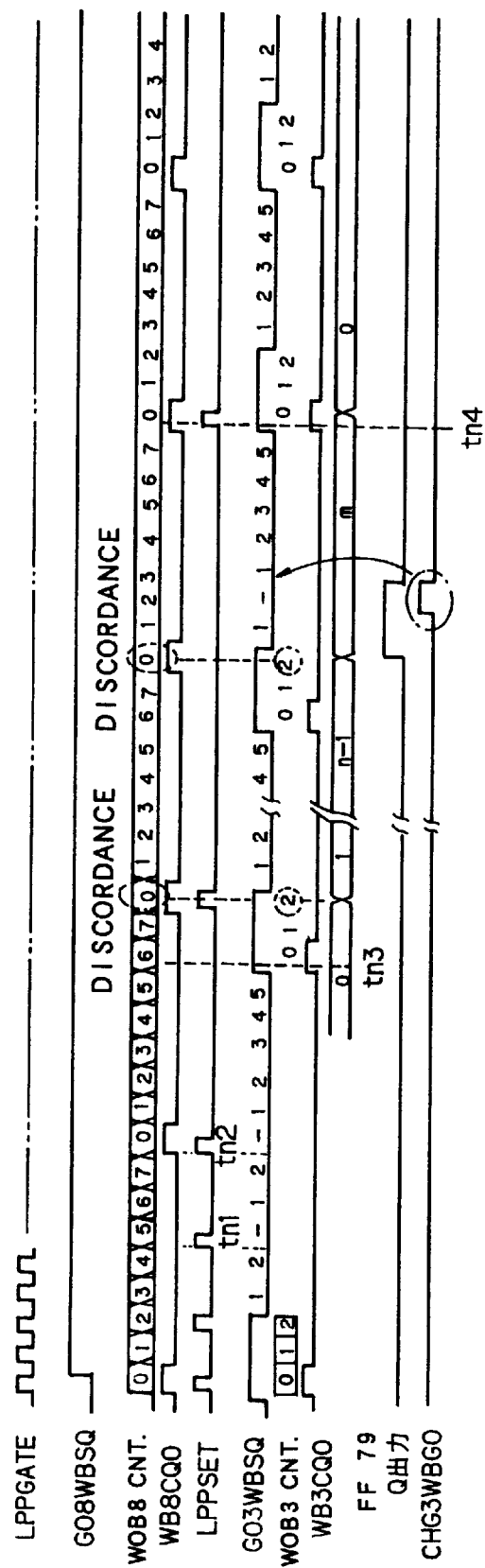
FIG. 15 is a timing chart illustrating an operation example of the WB8 counter protection circuit.

On the other hand, each time the noise is generated at the times tn1 and tn2 as shown in FIG. 15, some of the outputs of the shift register 56 in the ZERO5DET unit 40 become "1", and the shift register 56 begins shifting the 5 cycles of "0"-output from the timing just after the time tn2. Namely, the ZERO5DET signal becomes ON state at the time tn3. When the GO3WBSQ signal becomes ON state, the count value of the WOB3 counter 61 is "0" and the count value of the WOB8 counter 66 is "6". Therefore, the WB3CQ0 signal, outputted when the count value of the WOB3 counter 61 is "0", changes to ON state at different timing at which the WOB8CQ0 signal, outputted when the count value of the WOB8 counter 66 is "0", changes to ON state. As a result, the output of the discordance detection circuit 71 becomes ON state, and the binary counter 77 counts the number of the discordance detected. When the number of the successive discordance reaches four, the 4-counts output of the binary counter 77 becomes ON state. However, since the output of the flip-flop 82 connected to the input of the AND gate 78 is still "0", the AND gate 78 keeps on outputting "0". When the number of successive discordance reaches 16, the 16-counts output of the binary counter 77 becomes ON state, and the output of the flip-flop 79 becomes ON state. The output is inputted to the AND gate 80, and the CHG3WBGO signal becomes ON state at the timing when the WB8CQ2 signal, which becomes ON state at the output timing when the count value of the WOB8 counter 66 becomes "2", is outputted. The CHG3WBGO signal compulsorily changes the ZERO5DET signal to OFF state, and a new detection sequence of the ZERO5DET signal begins at the falling timing of the CHG3WBGO signal. In this way, according to this embodiment, if the discordance takes place successively for 16 times, the correction is carried out on the presumption that the cause of the discordance is the detection error of the ZERO5DET signal resulting from the noise component mixture. If the discordance is eliminated at the time tn4, as shown in FIG. 15, as a result of the correction, the WB3CQ0 signal and the WB8CQ0 signal change to ON state at the same time. Therefore, the output of the accordance detection circuit 72 becomes ON state, and the binary counter 77 is reset via the selector 74.

Figure 16:
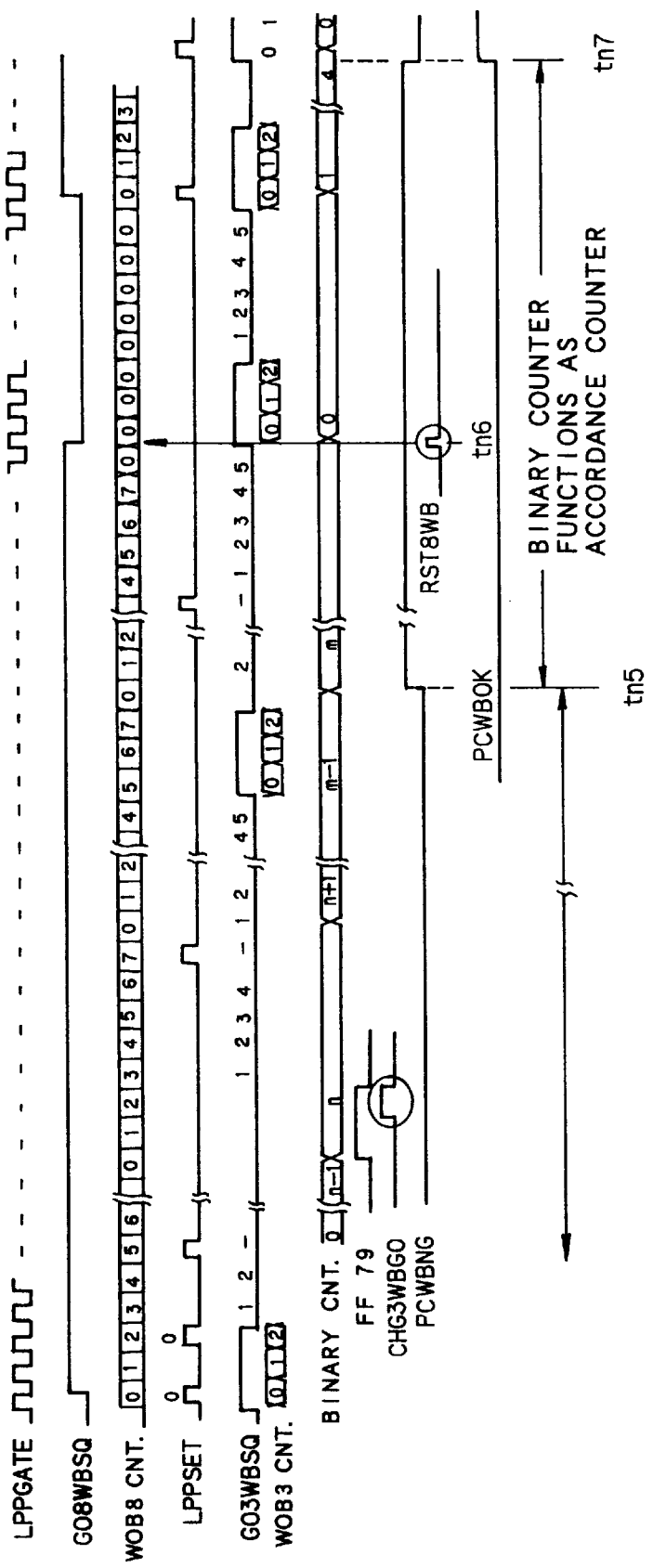
FIG. 16 is a timing chart illustrating another operation example of the WB8 counter protection circuit.

On the other hand, even if the CHG3WBGO signal is made ON state, when the LPPSET signal is disturbed by the noise, the discordance successively takes place and the number of the discordance reaches 32 times, the 32 counts output of the binary counter 77 becomes ON state and the PCWBNG signal outputted by the flip-flop 82 becomes ON state at the time tn5 as shown in FIG. 16. In the following ZERO5DET sequence, the GO3WOB signal becomes ON state, and the RST8WB signal used to reset the WOB8 counter 66 becomes ON state at the time tn6 which is the rising timing of the WB3INIT signal and at which the counting by the WOB3 counter 61 begins. When the RST8WB signal becomes ON state, it is inputted to the reset terminal of the flip-flop 65 shown in FIG. 11, and the GO8WBSQ signal outputted from the flip-flop 65 becomes OFF state. Further, the GO8WBSQ signal of OFF state is inputted to the enable terminal of the WOB8 counter 66, and hence the counting operation of the WOB8 counter 66 stops. The RST8WB signal is inputted to the reset terminal of the WOB8 counter 66, and hence the count value of the WOB8 counter 66 is cleared to be zero. As a result, the PCGATE signal, WB3GATE signal and the WB8CQ0 signal all become OFF state, and the phase comparison and decoding processing are terminated. This operation is needed for the following reason. Since the count value of the WOB8 counter 66 is judged to be discordant with the position of the pre-pit signal, it is required to start the re-pull-in operation to adjust the counting timing of the WOB8 counter 66 to the phase of the input pre-pit signal.

When the PCWBNG signal becomes ON state, the 1-input terminals of the selectors 73 and 74 become active, and the output from the accordance detection circuit 72 is inputted to the clock enable terminal of the binary counter 77. Namely, the binary counter 77 functions as a counter to count the number of the accordance of the WB3CQ signal and the WB8CQ0 signal. In the stopped condition of the WOB8 counter 66, if the pre-pit appears during the period in which the GO3WBSQ signal is ON state, the GO8WBSQ signal passed through the flip-flop 64 and 65 becomes ON state, and the WOB8 counter 66 starts counting. Then, if the WB3CQ0 signal coincides with the WB8CQ0 signal successively for four times, the 4-counts output of the binary counter 77, functioning as the coincidence counter, becomes ON state. In addition, since the PCWBNG signal is ON state, the PCWBOK signal outputted from the AND gate 78 becomes ON state at the time tn7 shown in FIG. 16. Consequently, the CPU is notified that the normal status has reached in which the position of the pre-pit signal is in the front three cycles of the 8-cycle wobbling signal. The PCWBOK signal of ON state is inputted to the OR gate 75 and the output of the OR gate 75 is supplied to the reset terminal of the flip-flop 82, and hence the PCWBNG signal becomes OFF state. By this, the 0-inputs of the selectors 73 and 74 become active, and the binary counter 77 again functions as a counter to count the discordance number of the WB3CQ0 signal and the WB8CQ0 signal.

As described above, according to this embodiment, the counting starts in a fashion synchronized with the sync bit of the pre-pit signal. Thereafter, the WOB8 counter, free-running in synchronism with the recording clock VCK, counts the 8-cycles of the wobbling signal, and the phase comparison and the decoding processing is executed using only the pre-pit signals which appear in the front 3 cycles of the 8-cycles. Therefore, the comparison and the decoding processing are correctly performed without erroneous detection even if noise component is mixed to the wobbling signal. In addition, the pre-pit signal is detected by the ZERO5DET unit 40 and the WOB3 counter unit 41 on the real-time basis. Therefore, even if the WOB8 counter 66 start free-running at incorrect timing, the WB8 counter protection circuit 43 resets the WOB counter 66 when the WOB3 counter unit 41 is correct, thereby constantly ensuring accurate pre-pit signal detection. Further, if the WOB3 counter unit 41 erroneously detects noise component, the accurate pre-pit detection is ensured because the WOB8 counter protection circuit 43 resets the WOB counter unit 41.

Figure 17:
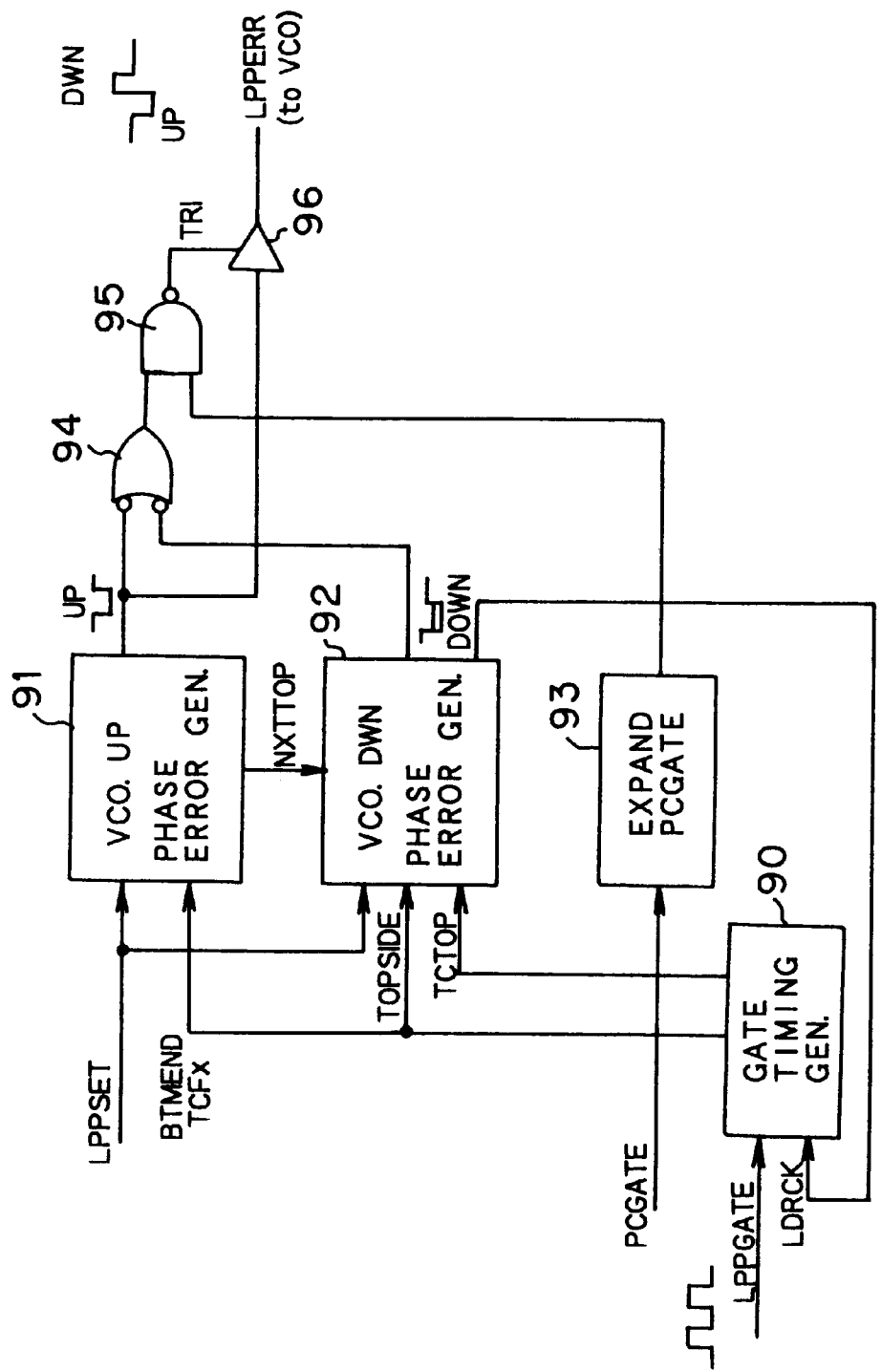
FIG. 17 is a block diagram illustrating a schematic configuration of a phase comparator for the pre-pit signal.

Next, the description will be given of the phase comparator 24 for the pre-pit signal. As shown in FIG. 17, the phase comparator 24 for the pre-pit signal includes the gate timing generator 90, the phase error generator 91 for increasing the voltage of the VCO 28, the phase error generator 92 for decreasing the voltage of the VCO 28, the expander 93 for extending the PCGATE signal, the NOR gate 94, the NAND gate 95 and the amplifier 96. In this embodiment, the error voltage characteristic shown in FIG. 18A is employed, and the gate timing generator 90 outputs the internal reference phase signal TCFx at the timing when the error voltage becomes zero. In addition, the gate timing generator 90 supplies the BTMEND signal indicating the initial timing of the voltage control of the VCO 28 to the phase error generator 91, and supplies the TOPSIDE signal indicating the critical timing for the expanding processing of the PCGATE signal to the phase error generator 92. The phase error generators 91 and 92 judge the detection timing of the LPPSET signal with respect to the BTMEND signal and the TOPSIDE signal to determine the adjusting voltage for the VCO 28, respectively.

If the LPPSET signal is detected at the timing as shown in FIG. 18F, for example, the LPPERR signal is outputted via the gates 94 and 95 and the amplifier 96 so as to increase the output voltage of the VCO 28 in the period from this detection timing until the internal reference phase signal TCFx. On the other hand, in the example of FIG. 18G, the LPPERR signal is outputted to decrease the voltage of the VCO 28 in the period from the detection timing of the pre-pit signal until the timing of the TOPSIDE signal. In the example shown in FIG. 18F, since the phase error is large, the LPPERR signal is outputted to increase the voltage of the VCO 28 in the period of a constant time width from the BTMEND signal to the TCFX signal to avoid the excessive gain of the VCO 28. In the example of FIG. 18I, the LPPERR signal of constant width is outputted in the similar manner. However, in this case, the PCGATE signal indicating the phase comparison period is expanded by the expander 93 to output the LPPERR signal of a constant width which decreases the voltage.

In this embodiment, since the phase comparison is performed in this manner, the phase can be rapidly and correctly brought to the locked state. Further, the accurate phase comparison is carried out only during the ON state period of the PCGATE signal based on the pre-pit signal correctly detected and decoded as described above.

The above embodiment is described for the application of the present invention to the DVD-R, however the application of the present invention is not limited to this. Namely, the present invention is applicable to recording digital information on any kind of storage medium, e.g., a tape-shaped storage medium, which is recorded with recording control information in the form of wobbled tracks.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No.09-149770 filed on Jun. 6, 1997 including the specification, claims, drawings and summary is incorporated herein by reference in its entirety.

What is claimed is:

1. A pre-pit information detecting device for detecting information recorded in a form of pre-pits on a storage medium which is recorded with movement control information for controlling a moving speed of the storage medium at the time of recording main information on the storage medium and recording control information for use in a recording control at the time of recording the main information, said movement control information being recorded by wobbling information tracks for carrying the main information at a frequency corresponding to the movement control information, said recording control information being recorded by forming the pre-pits on neighboring tracks of the information track in a predetermined relation in phase with the wobbled information tracks, said device comprising:

a pickup for irradiating a light beam on the information track and the neighboring tracks at the same time and for outputting a reproduction signal based on the light beam reflected by the information track and the neighboring tracks;

a wobbling signal extracting unit for extracting only the wobbling signal indicating the movement control information from the reproduction signal outputted;

a pre-pit signal detector for detecting a pre-pit signal multiplexed with the wobbling signal from the reproduction signal outputted;

a measuring unit for measuring a pre-pit signal absent period, in which the pre-pit signal detector detects no pre-pit signal, on a wobbling signal period basis; and a detection enabling unit for judging whether or not the pre-pit signal absent period accords with a first predetermined period, and for enabling the pre-pit signal detection by the pre-pit signal detector in a second predetermined period determined on the basis of the wobbling signal period if the pre-pit signal absent period accords with the first predetermined period.

2. A device according to claim 1, further comprising:

a first counter for counting the second predetermined period; and a second counter for starting a free-running at a period corresponding to the wobbling signal period in response to a first pre-pit detection after the pre-pit detection is enabled and for counting a time passage from a start of the free-running.

3. A device according to claim 2, further comprising:

a comparator for comparing a counting start timing by the first counter with a counting start timing by the second counter and for calculating a discordance number of the counting start timings on the wobbling signal period basis; and a correcting unit for restarting one of the first counter and the second counter based on the discordance number.

4. A device according to claim 2, further comprising a timing signal generator for generating a timing signal for use in a pre-pit signal analysis in accordance with the time passage counted by the second counter.

5. A device according to claim 4, further comprising:

a reference signal generator for generating a reference signal of a given frequency; and a phase comparator for comparing the phase of the pre-pit signal with the phase of the reference signal to vary the frequency of the reference signal such that a phase difference between the pre-pit signal and the reference signal converges to be within a given range, said phase comparator being enabled only within a period when the timing signal generator outputs the timing signal.

6. A method of detecting information recorded in a form of pre-pits on a storage medium which is recorded with movement control information for controlling a moving speed of the storage medium at the time of recording main information on the storage medium and recording control information for use in a recording control at the time of recording the main information, said movement control information being recorded by wobbling information tracks for carrying the main information at a frequency corresponding to the movement control information, said recording control information being recorded by forming the pre-pits on neighboring tracks of the information track in a predetermined relation in phase with the wobbled information tracks, said method comprising the steps of:

irradiating a light beam on the information track and the neighboring tracks at the same time and outputting a reproduction signal based on the light beam reflected by the information track and the neighboring tracks;

extracting only the wobbling signal indicating the movement control information from the reproduction signal outputted;

detecting a pre-pit signal multiplexed with the wobbling signal from the reproduction signal outputted;

measuring a pre-pit signal absent period, in which no pre-pit signal is detected, on a wobbling signal period basis; and judging whether or not the pre-pit signal absent period accords with a first predetermined period, and enabling the pre-pit signal detection in the pre-pit signal detection step within a second predetermined period determined on the basis of the wobbling signal period if the pre-pit signal absent period accords with the first predetermined period.

7. A method according to claim 6, further comprising the steps of:

counting the second predetermined period; and starting a free-running at a period corresponding to the wobbling signal period in response to a first pre-pit detection after the pre-pit detection is enabled and counting a time passage from a start of the free-running.

8. A method according to claim 7, further comprising the steps of:

comparing a counting start timing by the counting step with a counting start timing by free-running starting step and calculating a discordance number of the counting start timings on the wobbling signal period basis; and restarting one of the counting step and the free-running starting step based on the discordance number.

9. A method according to claim 7, further comprising the step of generating a timing signal for use in a pre-pit signal analysis in accordance with the time passage counted by the free-running starting step.

10. A method according to claim 9, further comprising the steps of:

generating a reference signal of a given frequency; and comparing the phase of the pre-pit signal with the phase of the reference signal to vary the frequency of the reference signal such that a phase difference between the pre-pit signal and the reference signal converges to be within a given range, said phase comparator being enabled only within a period when the timing signal is outputted.

* * * * *